(12) United States Patent
Piestun et al.

(10) Patent No.: US 11,716,209 B2
(45) Date of Patent: Aug. 1, 2023

(54) SYSTEMS AND METHODS FOR AZIMUTHAL MULTIPLEXING THREE-DIMENSIONAL DIFFRACTIVE OPTICS

(71) Applicant: The Regents of the University of Colorado, Denver, CO (US)

(72) Inventors: Rafael Piestun, Boulder, CO (US); Haiyan Wang, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/230,892

(22) Filed: Apr. 14, 2021

(65) Prior Publication Data
US 2021/0320808 A1  Oct. 14, 2021

Related U.S. Application Data

(60) Provisional application No. 63/009,670, filed on Apr. 14, 2020.

(51) Int. Cl.
  *H04B 10/548*  (2013.01)
  *H04L 9/38*  (2006.01)
  *G02B 27/42*  (2006.01)

(52) U.S. Cl.
  CPC ............ *H04L 9/38* (2013.01); *G02B 27/4233* (2013.01); *H04B 10/548* (2013.01)

(58) Field of Classification Search
  CPC .......................... G02B 27/4233; H04B 10/548
  See application file for complete search history.

(56) References Cited

U.S. PATENT DOCUMENTS 3,593,029 A * 7/1971 Sakaguchi ............. G09G 3/003
  345/55
4,057,319 A * 11/1977 Ash ......................... G02B 5/32
  359/34
5,579,115 A * 11/1996 Stein .................... H04N 1/0813
  347/264

(Continued)

FOREIGN PATENT DOCUMENTS

CN   1171560 A  *  1/1998  ............... G01D 5/38
CN   100451736 C  *  1/2009  ........... G02B 27/286

OTHER PUBLICATIONS

O'Shea, Donald C. et al., "Diffractive Optics Design, Fabrication, And Test," Tutorial Texts in Optical Engineering, vol. TT62, 13 pages, 2004.

(Continued)

*Primary Examiner* — Tanya T Motsinger

(57) ABSTRACT

Systems and methods for azimuthal multiplexing using three-dimensional diffractive optics An azimuthal optical multiplexing system includes a light source. The system includes two or more at least partially transparent plates. Each plate of the two or more plates has a structured or patterned surface positioned in an optical path of the light source. The system includes means for rotating at least one plate of the two or more plates axially with respect to at least one other plate of the two or more plates. The means for rotating is operatively coupled to the at least one plate. The structured or patterned surface is configured to modulate light directed along the optical path and through the two or more plates.

20 Claims, 24 Drawing Sheets

(56) References Cited

U.S. PATENT DOCUMENTS

| | | | | |
|---|---|---|---|---|
| 5,644,420 | A * | 7/1997 | Nakane | B82Y 10/00 369/112.02 |
| 6,424,444 | B1 * | 7/2002 | Kahn | H04L 25/4917 398/183 |
| 7,116,480 | B1 * | 10/2006 | Li | G02F 1/31 385/39 |
| 7,315,665 | B1 * | 1/2008 | Anderson | G02F 1/13471 385/11 |
| 7,438,325 | B2 * | 10/2008 | Rocca | F16L 27/087 285/121.6 |
| 9,001,198 | B2 * | 4/2015 | Ito | H04N 13/341 359/465 |
| 9,146,391 | B2 * | 9/2015 | Ouchi | G02B 21/367 |
| 9,238,359 | B2 * | 1/2016 | Koberg | B41F 27/02 |
| 9,294,190 | B2 * | 3/2016 | Sodot | H04B 10/6163 |
| 9,354,604 | B2 * | 5/2016 | Lee | G03H 1/0808 |
| 10,323,934 | B1 * | 6/2019 | Rumala | G01P 3/36 |
| 10,412,371 | B1 * | 9/2019 | Chao | H04N 13/229 |
| 10,996,453 | B2 * | 5/2021 | Newman | G01N 21/6458 |
| 11,381,790 | B2 * | 7/2022 | Nakagoshi | G03B 21/14 |
| 11,409,199 | B2 * | 8/2022 | Kato | G03F 7/70383 |
| 2004/0130810 | A1 * | 7/2004 | Valette | G02B 27/144 359/861 |
| 2006/0268207 | A1 * | 11/2006 | Tan | G02B 5/3083 349/117 |
| 2006/0291057 | A1 * | 12/2006 | Fiolka | G02B 27/286 359/486.03 |
| 2008/0252800 | A1 * | 10/2008 | Tan | G02F 1/133634 349/8 |
| 2009/0009668 | A1 * | 1/2009 | Tan | G02B 5/3016 349/1 |
| 2010/0253827 | A1 * | 10/2010 | Kawakami | G02B 27/286 348/340 |
| 2014/0125956 | A1 * | 5/2014 | Chifu | G03B 33/12 353/31 |
| 2015/0008601 | A1 * | 1/2015 | Kakubari | G02B 5/3016 264/1.34 |
| 2016/0038025 | A1 * | 2/2016 | Irsch | G02B 27/283 351/215 |
| 2016/0077378 | A1 * | 3/2016 | Choi | H01L 27/12 438/30 |
| 2016/0170199 | A1 * | 6/2016 | Inoue | H04N 9/3158 353/31 |
| 2016/0274384 | A1 * | 9/2016 | Takiguchi | G02B 13/22 |
| 2018/0284417 | A1 * | 10/2018 | Deisseroth | G02B 21/0012 |
| 2021/0320808 | A1 * | 10/2021 | Piestun | H04L 9/001 |

OTHER PUBLICATIONS

Pavani, Sri Rama Prasanna et al., "High-Efficiency Rotating Point Spread Functions," Optics Express, vol. 16, No. 5, pp. 3484-3489, Mar. 3, 2008.

Wang, Haiyan et al., "Dynamic 2D Implementation Of 3D Diffractive Optics," Optica, vol. 5, No. 10, pp. 1220-1228, Oct. 2018.

Wyrowski, Frank et al., "Speckle-Free Reconstruction In Digital Holography," J. Opt. Soc. Am. A, vol. 6, No. 8, pp. 1171-1174, Aug. 1989.

* cited by examiner

SYSTEMS AND METHODS FOR AZIMUTHAL MULTIPLEXING THREE-DIMENSIONAL DIFFRACTIVE OPTICS

CROSS-REFERENCE TO RELATED APPLICATIONS

This application claims priority to U.S. Provisional Application No. 63/009,670 filed on Apr. 14, 2020, which is incorporated herein by reference in its entirety for all purposes.

STATEMENT OF FEDERALLY SPONSORED RESEARCH

This invention was made, in part, with government support under Grant Nos. 1548924 and 1556473 awarded by National Science Foundation (NSF). The government has certain rights in the invention.

TECHNICAL FIELD

Various embodiments of the present technology generally relate to optical systems. More specifically, some embodiments relate to systems and methods for azimuthal multiplexing using three-dimensional diffractive optics.

BACKGROUND

Diffractive optics have increasingly caught the attention of the scientific community. Classical diffractive optics are 2D diffractive optical elements (DOEs) and computer-generated holograms (CGHs), which modulate optical waves on a solitary transverse plane. However, potential capabilities are missed by the inherent two-dimensional nature of these devices. Previous work has demonstrated that extending the modulation from planar (2D) to volumetric (3D) enables new functionalities, such as generating space-variant functions, multiplexing in the spatial or spectral domain, or enhancing information capacity. Unfortunately, despite significant progress fueled by recent interest in metasurface diffraction, 3D diffractive optics still remains relatively unexplored.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

The present technology provides improved systems and methods for azimuthal optical multiplexing. The design, fabrication and operation of three-dimensional (3D) diffractive optics is demonstrated to show the multiplexing effect. According to what the inventors believe is a hitherto unknown phenomenon, multiple pages of information are encoded and can be read out across independent channels by rotating one or more diffractive layers (also referred to herein as plates) with respect to the others. The concept may be implemented practically in a physical apparatus or system with multilayer diffractive optical elements. An iterative projection optimization algorithm helps solve the inverse design problem. The experimental realization using photolithographically fabricated multilevel phase layers demonstrates the predicted performance. Limitations and potential advantageous applications of azimuthal multiplexing 3D diffractive optics according to the present technology are also discussed herein.

This application is related to U.S. application Ser. No. 16/431,412 filed on Jun. 4, 2019, which is incorporated by reference herein in its entirety to the extent it is not inconsistent with the present disclosure.

One aspect of the present technology provides an azimuthal optical multiplexing system. In one embodiment, the azimuthal optical multiplexing system includes a light source. The system includes two or more at least partially transparent plates. Each plate of the two or more plates has a structured or patterned surface positioned in an optical path of the light source. The system includes means for rotating at least one plate of the two or more plates axially with respect to at least one other plate of the two or more plates. The means for rotating is operatively coupled to the at least one plate. The structured or patterned surface is configured to modulate light directed along the optical path and through the two or more plates.

Another aspect of the present technology provides a method of operating an optical multiplexing system. In one embodiment, the method includes the step of transmitting light from a light source through two or more at least partially transparent plates having structured and patterned surfaces positioned in an optical path of the light. The method includes the step of modulating, by the two or more plates, the light transmitted along the optical path and through the two or more plates. The method includes the step of rotating at least one plate of the two or more plates axially with respect to at least one other plate of the two or more plates. The method includes the step of transitioning, by the rotating, through or between a plurality of output states of the light transmitted along the optical path and through at least a second plate of the two or more plates positioned most distally from the light source.

Yet another aspect of the present technology provides a cryptographic apparatus. In one embodiment, the cryptographic apparatus includes two or more at least partially transparent plates. At least one of the two or more plates has a structured or patterned surface formed thereon. A first plate of the two or more plates is positioned proximal a first end of the apparatus, and at least a second plate of the two or more plates is positioned proximal a second end of the apparatus opposite the first end. The apparatus includes at least one light source positioned and configured to transmit light along an optical path defined by at least portions of: the two or more plates, and the structured or patterned surface. The structured or patterned surface is configured to modulate the light. The apparatus includes means for rotating at least one plate of the two or more plates. The means for rotating is operatively coupled to the at least one plate, and is configured to axially rotate the at least one plate with respect to at least one other plate of the two or more plates. In some embodiments, the apparatus may include means for detecting the light following passage through the two or more plates along the optical path.

BRIEF DESCRIPTION OF THE DRAWINGS

Embodiments of the present technology will be described and explained through the use of the accompanying drawings.

Figure 1:
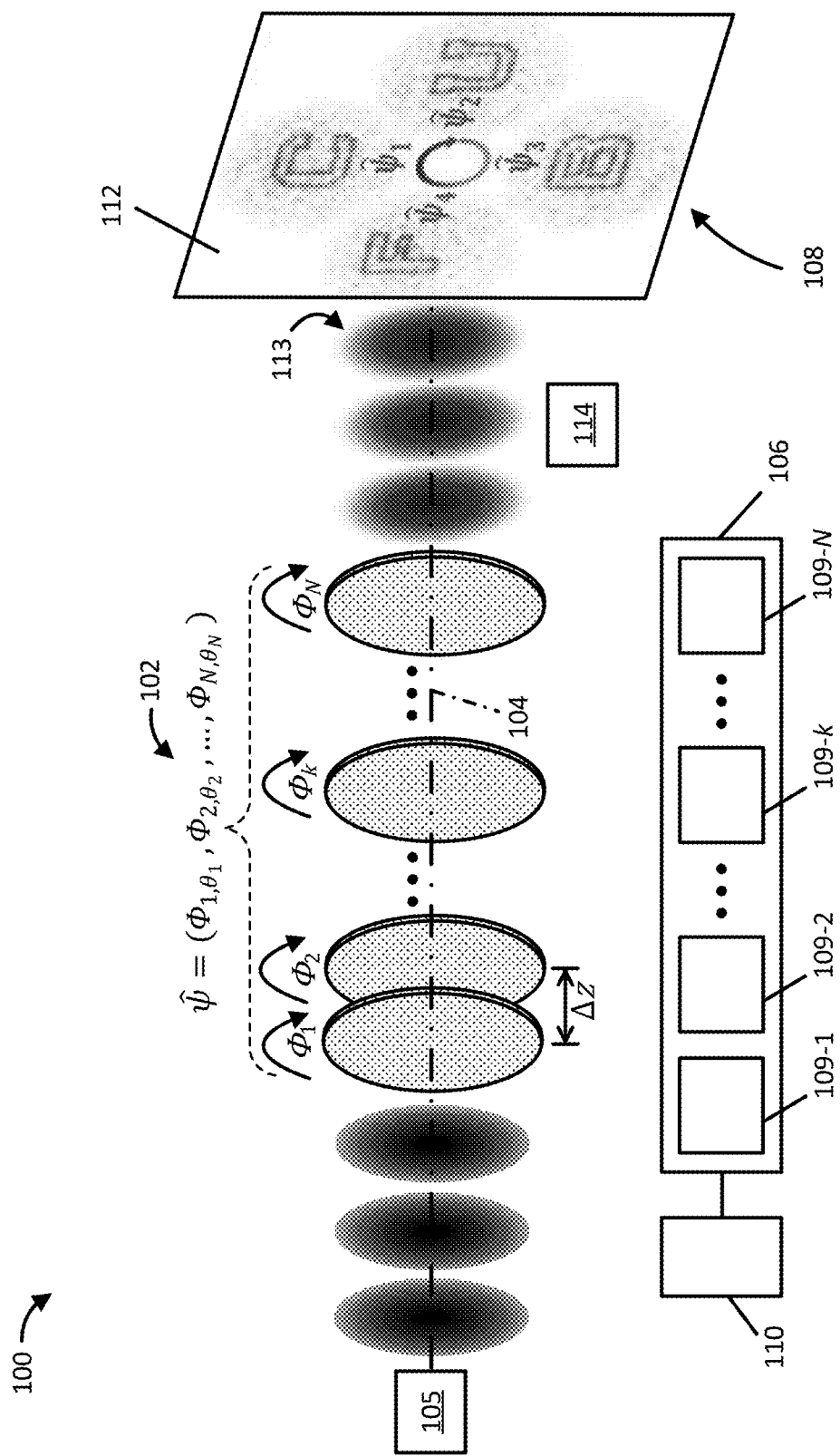
FIG. 1 depicts a diagram of 3D diffractive optics, according to an embodiment of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

With feature sizes comparable to electromagnetic wavelength, diffractive optics offer a unique pathway to light manipulation. It expands the capabilities of conventional optics based on refraction or reflection and in conjunction with free-form, graded index, and artificial (meta) materials provide full access to the spatial degrees of freedom of light. Further, new insight in wave manipulation and the ever-increasing power of computers enable diffractive optics to generate user-defined wavefronts from arbitrary inputs, by virtue of degrees of freedom from pixels that can be addressed individually and independently. Beyond classical applications such as beam shaping, 3D display, information security, spectroscopy, metrology, and astronomical imaging, emerging areas include optical tweezers, novel microscopies, coherent control, quantum information, neural networks, and optogenetics.

Three dimensional (3D) diffractive optics expand the capabilities of traditional two-dimensional elements not only by providing higher diffraction efficiency and higher information capacity, but also enabling functionalities such as multiplexing and space-variant functions. The capability of controlling multidimensional spatial, spectral, temporal, and coherence functions of light fields is originated from the multi-subject nature of 3D diffractive optics involving diffraction, refraction, absorption, resonances, and scattering.

In spite of being a topic of great interest, 3D diffractive optics have not been fully investigated due to their physical and mathematical complexity, where the challenge stems from three aspects: First, the wavefront propagation must obey Maxwell's equations, while most arbitrary target patterns do not, causing the problem to be inconsistent. Second, the finite degrees of freedom due to finite volumetric space-bandwidth and limited phase/amplitude modulation narrows the scope of possible solutions. Third, the interaction of novel physical phenomena within the volumetric optics and the need for multiplexing increasing information calls for mathematical models where multiple interdependent design metrics are optimized simultaneously. Moreover, it is often important to distribute the information evenly, within a relatively small volume under control.

Holographic multiplexing refers to the possibility of encoding multiple pages of data by changing spatial, frequency, or polarization characteristics of the inputs. It is a unique property of 3D diffractive optics which allows for independent information to be distributed throughout the recording medium. Individual signals can be retrieved with minimum crosstalk, as a result of the engineering of the volumetric refractive index structure. The reconstruction degrades as the input beam deviates from the designed values, namely Bragg-like behavior, and this selectivity is mainly determined by the thickness of the structure. Angular and frequency (wavelength) multiplexing are the most common forms of multiplexing. The former one enables additional information to be encoded but requires extra effort in alignment, whereas the latter one is easier to arrange but requires a complicated laser system that can be tuned in a broad spectrum.

Other techniques, proposed in optically recorded holography, include peristrophic and shift multiplexing, referring to rotation and translation of the holographic sample. However, they are limited by the possible 3D fields obtained from the interference of an object and reference waves inside photosensitive materials.

Early in the 1970s, Alvarez and Lohmann independently proposed composite lenses whose focal length can be adjusted continuously by shifting laterally two optical elements with cubic phase profile. Recent work improved on this idea by implementing the tuning mechanism through rotation. These devices are designed analytically to continuously change the optical power of lenses or axicons.

In azimuthal optical multiplexing, multiple optical output signals, or states, are transitioned, or otherwise, switched, changed or altered, upon the relative rotation of one or more layers (also referred to herein as plates) within the 3D diffractive structure. An inverse design approach with an iterative projection algorithm with distribution on layers is provided. The principal is experimentally demonstrated the principle with two phase layers, or plates, fabricated lithographically following the multilevel binary optics technique. The disclosure is organized as follows: First, a physical model is introduced for computing the light propagation in 3D diffractive optics by decomposing the device into multiple thin layers of phase modulation. Then examples of design results and experimental validation are provided.

Theory

Physical Model

Consider a stratified 3D diffractive optical element composed of multiple 2D layers of phase modulation spatially separated by thin homogeneous isotropic media, as shown in FIG. 1. Each layer, or plate, can rotate with respect to a common axis (the optical axis). Under the scalar and thin-element approximation, the phase modulation for coherent illumination can be described by $$E(x,y,z_k^+) + \exp\{j\phi_{k,\theta}(x,y)\}E(x,y,z_k^-), \quad (1)$$

where E is the complex amplitude, k is the layer number and e denotes its rotation angle. In the homogenous region between adjacent layers, diffraction occurs and can be described by the angular spectrum propagation in free space $$E(x, u, z_{k+1}^-) = \mathscr{F}^{-1}\left\{e^{-j\sqrt{k_0^2-k_x^2-k_y^2}\cdot\Delta z}\cdot\mathscr{F}[E(x,y,z_k^+)]\right\}. \quad (2)$$

where $\Delta z$ is the layer separation, "$z^+$", "$z^-$" represent the coordinates immediately before and after the corresponding layer, and F is the Fourier transform. The wave field on the reconstruction plane is calculated using Fresnel or Fraunhofer propagation.

$$E_R(x,y) = \begin{cases} \mathscr{F}^{-1}\left\{e^{-j\sqrt{k_0^2-k_x^2-k_y^2}\cdot z_R}\cdot\mathscr{F}[E(x,y,z_N^+)]\right\}, & \text{Fresnel region} \\ Q\left[\frac{1}{\lambda f}\right]V\left[\frac{1}{\lambda f}\right]\mathscr{F}[E(x,y,z_N^+)], & \text{Fraunhofer region} \end{cases} \quad (3)$$

where Q is the quadratic factor and V is the scaling factor. $z_R$ is the distance from the last layer to the reconstruction plane and f is the focal length of the Fourier lens. The propagation process is also reversible, described by the conjugate forms of the above equations. Accordingly, the phase for each layer satisfies $$\phi_{k,\theta}(x,y) = \arg\left\{\frac{E(x,y,z_k^+)}{E(x,y,z_k^-)}\right\}. \quad (4)$$

A 3D diffractive optics system is composed of N wavefront modulation layers that can rotate around a common axis. The vector is defined as $$\hat{\psi}=(\phi_{1,\theta_1},\ldots\phi_{N,\theta_N})$$

where $\phi_{i,\theta_i}$ represents the orientation $\theta_i$ of layer i. The system provides a different optical output functionality for different input states based on the information stored in the various modulation layers.

FIG. 1 depicts a diagram of 3D diffractive optics system 100, according to an embodiment of the present technology. System 100 is an azimuthal optical multiplexing system 100. In the embodiment, N layers of phase modulation (e.g., two or more plates 102) are separated by a free-propagation distance, $\Delta z$. The distance $\Delta z$ may be automatically, or manually, adjustable in some embodiments of system 100.

Four plates 102 are illustrated in FIG. 1. Each layer, or plate 102, can rotate with respect to the optical axis 104 while optical waves are modulated upon propagation through the 3D diffractive optics system 100. An input light source 105, such as a laser or a coherent light source, may be positioned such that the optical, or light, waves may pass through the plurality of plates 102 during such times that light source 105 is energized. A means 106 for rotating each plate 102 with respect to one or more of the other plates 102 of system 100 is operatively coupled to each plate 102. In an example, plates 102 may have formed on their circumferential edges gear teeth, and the rotating means 106 may be embodied in a plurality (e.g., 109(1), 109(2) . . . 109(k) . . . 109(A) of electric motors 109 (e.g., stepper type) that are operatively coupled to gears or gear sets configured to match the gear teeth of respective plates 102, such that when the motors 109 are respectively energized by, for instance, a motor controller 110, the plates 102 are independently rotated by precise angular displacements in either the clockwise or counter-clockwise directions. In another example, plates 102 may be devoid of gear teeth, and instead motors 109 may be operatively coupled to a wheel having a circumferential with a material of construction (e.g., rubber) that contacts circumferential edges of plates 102 with friction sufficient to enable plates 102 to rotate upon motors 109 being energized using controller 110. In yet another example, the rotating means 106 may make use of a structure or component, or a plurality of them, that enable each of the plurality of plates 102 to be hand rotated (see, e.g., rotatable adaptors 412 shown and described below with reference to FIG. 4C).

Various other rotating means 106 may be utilized in system 100 either alone, or in combination with one or more of the aforementioned means 106. Such other presently known, or as yet undiscovered, rotating means 106 are expected to be readily comprehensible to persons having ordinary skill in the art and applied for use in the present technology without undue experimentation. The state of the system 100 is defined by the vector $\hat{\psi}$ composed of the orientation of each layer, or plate 102.

The azimuthal optical multiplexing system 100 may be designed in such a way that different states generate different output functions 108, which may be visualized using a means 112 for detecting the output 113 light of system 100. Such means 112 may include one or more of a camera, a charged coupled device (CCD) sensor, a CMOS sensor, a liquid crystal display (LCD), a photodetector, a screen, and structure(s) or component(s) enabling the output 113 to be seen with human eyes (either with or without the aid of a magnifying device). In the embodiment illustrated in FIG. 1, detecting means 112 is positioned optically downstream of the light source 105 and downstream of at least the second (or the N-th) plate 102 positioned most distally from the light source 105.

Azimuthal Multiplexing Design

Given a 3D diffractive optics system (e.g., 100) consists of N layers, or plates 102, the phase modulation functions (e.g., $\phi_1, \phi_2, \ldots \phi_k, \ldots \phi_N$) may be calculated layer by layer, starting with setting all of them to random values while the amplitude is a circular function. The input is $E(x,y,z_1^-)$ which contains the information of wavelength and incident angle, both are constants in this case. There are m+1 pages of reconstruction patterns to be multiplexed $E_R^0(x,y)$, $E_R^1(x,y)$, ..., $E_R^m(x,y)$ with the corresponding rotation angle of the k-th layer at 0, $\theta_1$, ..., $\theta_m$. Accordingly, azimuthal multiplexing 3D diffractive optics may be designed using an iterative projection optimization algorithm with a distribution on layers (e.g., plates 102) method. This approach is flexible, as the layer, or plate 102, being rotated can be any one or any combinations from 0 to N, and can switch during the encoding process.

The layer of phase modulation in round shape may be designed to ensure it rotates to an arbitrary angle without redundant pixels or the need to enlarge the beam size from light source 105, and a bilinear interpolation may be applied to keep the number of active pixels constant during rotation. Notably, the calculation of backward propagation may apply the following constraints to avoid error caused by zero denominator due to the zeros outside the aperture $$E(x, y, z_k^-) = \sum_{i,j} E(x_i, y_j, z_k^-) = \frac{E(x, y, z_k^+)}{\exp\{j\phi_{k,\theta}(x_i, y_j)\}}, \quad (5)$$

$$\text{where } x_i, y_j \in circ\left(\frac{\sqrt{x^2 + y^2}}{r}\right)$$

where r is the radius of the layer, or plate 102. Hence, the connection between the input $E(x,y, z_1^-)$ and output $E_R(x,y)$ of the 3D diffractive optics is established.

Basically, there are three optimization loops embedded in the design algorithm. The first loop is to optimize one single layer (plate 102) according to the target metrics. The forward propagating model described by equations (1)-(3) is applied from input to the wave field in front of the k-th layer $E(x,y, z_k^-)$. The process is then continue to the reconstruction plane where the amplitude is updated with the pre-defined reconstruction field $E_R^0(x,y)$ and the phase is kept unchanged. Next, the backward propagation described by the conjugate form of equations (1)-(3) is applied from the reconstruction field to the wave field after the k-th layer $E(x, y, z_k^-)$. Thus, the phase modulation can simply be derived from equation (4). Function $\Phi_{k,0}^0$ is updated and the process may be iterated until $\Phi_{k,0}^0$ reaches a satisfactory solution or a predefined number of iterations is completed. This is the first loop, which is repeated for all the remaining layers, or plates 102, $\Phi_{1,0}^0$, $\Phi_{2,0}^0$, ... $\Phi_{2,0}^0$.

Then, the k-th layer, or plate 102, is rotated to $e_1$, and the above process may be repeated, except the reconstruction field is $E_R^1(x,y)$. As a result, the phase modulation is obtained as optimized for the second target $\Phi_{1,0}^{\theta_1}$, $\Phi_{2,0}^{\theta_1}$, ..., $\Phi_{k,\theta_1}^{\theta_1}$, $\Phi_{N,0}^{\theta_1}$. The same procedure may be followed until all the targets are encrypted, or encoded, in all the layers, and that becomes the second loop. The targets may carry information which can be encoded, or encrypted, by way of patterned or structured surfaces of plates 102. Such information may include one or more of: images, at least one spot, a speckle pattern, a random pattern, a non-random pattern, a pseudo-random pattern, and statistics or properties of the light propagated through at least a second plate of the two or more plates positioned most distally from the light source. In embodiments where output decoding and/or decrypting of output 113 are performed, system 100 may include means 114 (e.g., signal processor(s), additional optics, analysis or imaging software, associated computing systems and memory storage devices, and the like) for measuring or otherwise determining statistics of the light ultimately transmitted into or onto detector means 112.

Accordingly, system 100 may be considered, and find applications as, an optical combination lock-like cryptographic system employing optics with patterned or structured surfaces, and, in some embodiments, also incorporating metasurfaces, metaoptics, and/or diffractive optics, which may include nano-, or micro-structures, and be fabricated using photolithography processes, as described in greater detail below. In some embodiments, a first plate (e.g., 102-1) can encode or encrypt the information, and a second plate (e.g., 102-2) can serve as the key to decode or decrypt the information. Likewise, the cryptographic processes enabled by system 100, and the present technology more generally, are bidirectional, where, for instance, information that is decoded or decrypted could be presented in optical form to the second plate 102-2, be encoded or encrypted by the first plate 102-1, with the resultant output light waves being presented to the detecting means 112. In this example, the positions of light source 105 and detector mean 112 would be switched as compared to FIG. 1, but the positions of plates 102 would remain the same. In such embodiments, system 100 may be considered a cryptographic apparatus 100, functioning based the same or similar theoretical and operation principals, and design considerations, according to the present technology.

To ensure all the multiplexing cases being considered are evenly distributed among all the layers, a parallel projection may be applied, described by the following equation $$\phi_{j,0} = \frac{1}{m}\sum_{i=0}^{m} \phi_{j,0}^{\theta_i}, \; j = 0, 1, \ldots, N, \quad (6)$$

and the phase modulation functions $\phi$ may be updated. All the calculations up to this point conclude one iteration in the third optimization loop. The algorithm keeps iterating until the results are satisfactory or the iteration number is reached. The overall flowchart of the design algorithm is shown in FIG. 2.

Figure 2:
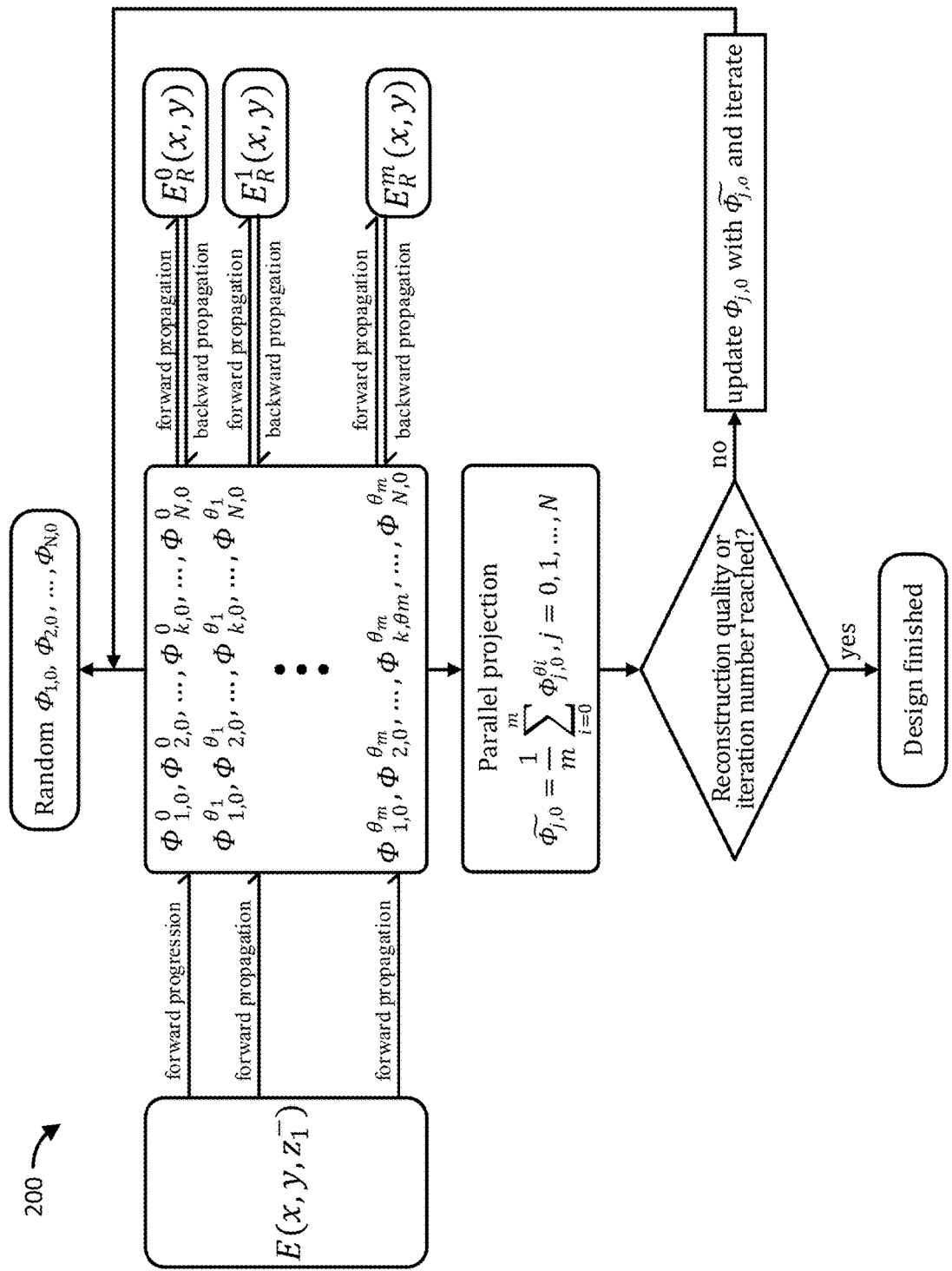
FIG. 2 is a flowchart of the iterative projection optimization algorithm used for the azimuthal multiplexing design, according to an embodiment of the present technology.

FIG. 2 is a flowchart of the iterative projection optimization algorithm 200 used for the azimuthal multiplexing design (e.g., for system 100), according to an embodiment of the present technology. Within each iteration, the wave fields are forward propagated from the input to the plane (e.g., plate 102) right before the k-th layer (plate 102) to be designed, and backward propagated from the preset target to the plane right after the k-th layer (plate 102) to be designed.

It should be noted that the convergence of the algorithm depends on the task complexity, namely the number of functions to be multiplexed, and degrees of freedom available, namely the number of layers (plates 102) and number of pixels in each layer (plate 102).

Example 1

To demonstrate principals of the present technology, a two-layer 3D diffractive optics was designed for azimuthal multiplexing of 4 functions. The target patterns are arbitrary, and defined digitally on a computer as the letters "C", "U", "B", "F" (FIG. 3B). They are encoded with 4 rotation angles of the second layer (second plate 102) respectively, which are purposely chosen to be off multiples of 90° at 0°, 88°, 195°, and 287°.

Design

The initial design of a 3D diffractive optics consisted of two layers (plates 102), separated by 1 mm ($\Delta z$). Each layer, or plate 102, has 128×128 pixels with a pixel pitch of 40 μm. The parameters were chosen to facilitate the alignment in the experiment in the lab environment. If that is not a concern, with high precision mounts, more compact devices can be designed for implementation of system 100 using smaller pixel size, and/or large volumetric bandwidth with enhanced pixel number.

Under a plane wave normal illumination at 633 nm from light source 105, the two layers (e.g., plates 102) with continuous phase modulation ranging in 0-2π were designed using the above described algorithm 200 of FIG. 2. However, to implement Example 1 experimentally with photolithography, the phase distribution was discretized. The system of Example 1 was thus designed to 8 phase levels, because it simplified the experimental implementation without compromising too much efficiency. For this, there were two possible approaches. The first one is the commonly used "hard-cut" approach where at each iteration the phase values are forced to the allowed ones they are closed to. The second one is the "soft-cut" approach which is built in the design algorithm 200 according to the present technology. This approach involves setting regions centered in the allowed 8 phase values, and if the designed phase value is outside those regions, it is expelled to the edge of whichever region it is close to. The allowed regions shrink with the iteration number until, at the end, there are only 8 phase values allowed. Compared with the "hard-cut" approach, the "soft-cut" approach according to the present technology helps the algorithm's convergence and improves the efficiency of the reconstruction. A detailed comparison is discussed below in Example 2.

Figure 3A:
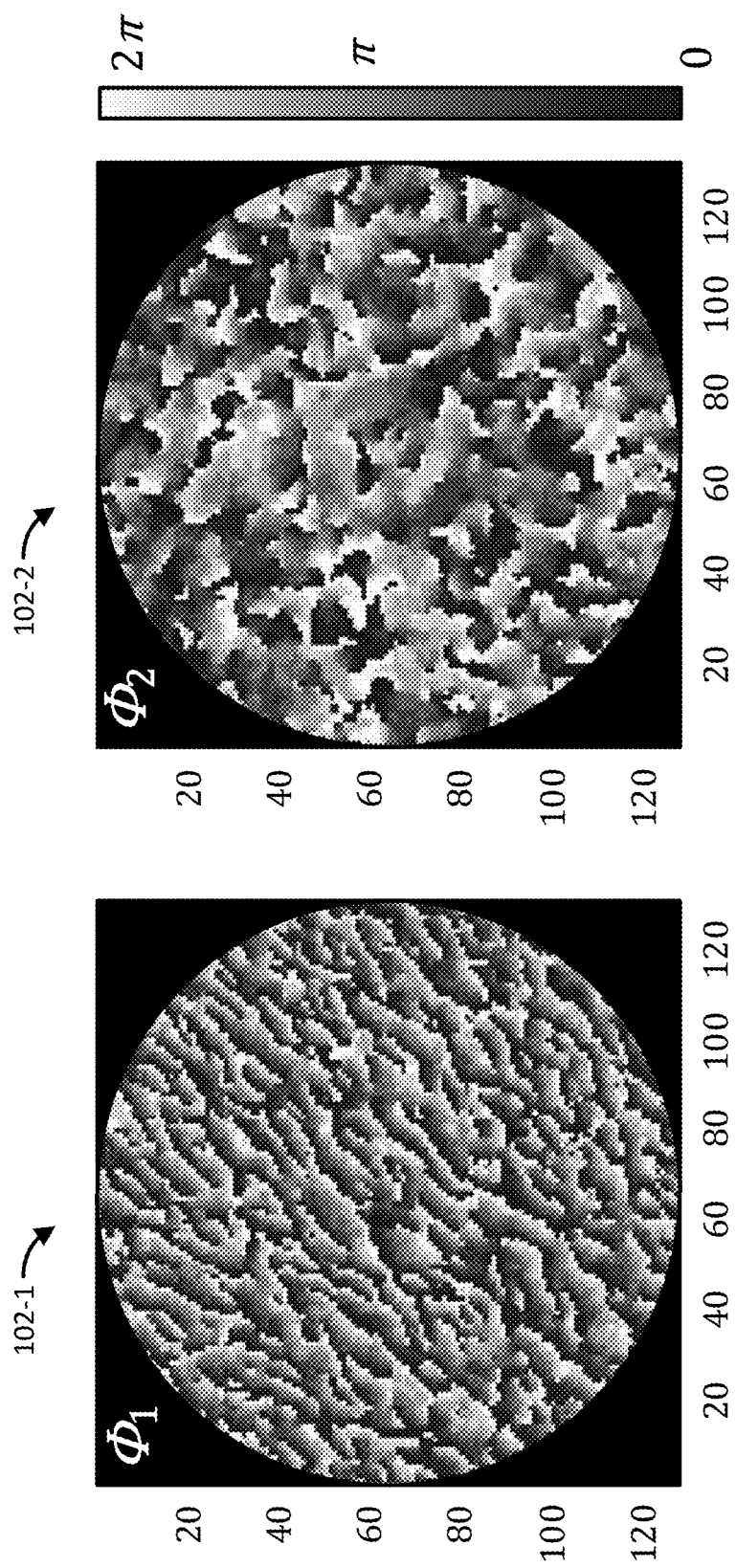
FIGS. 3A-3C depict simulation results of azimuthal multiplexing 3D diffractive optics, according to an embodiment of the present technology.
Figure 3B:
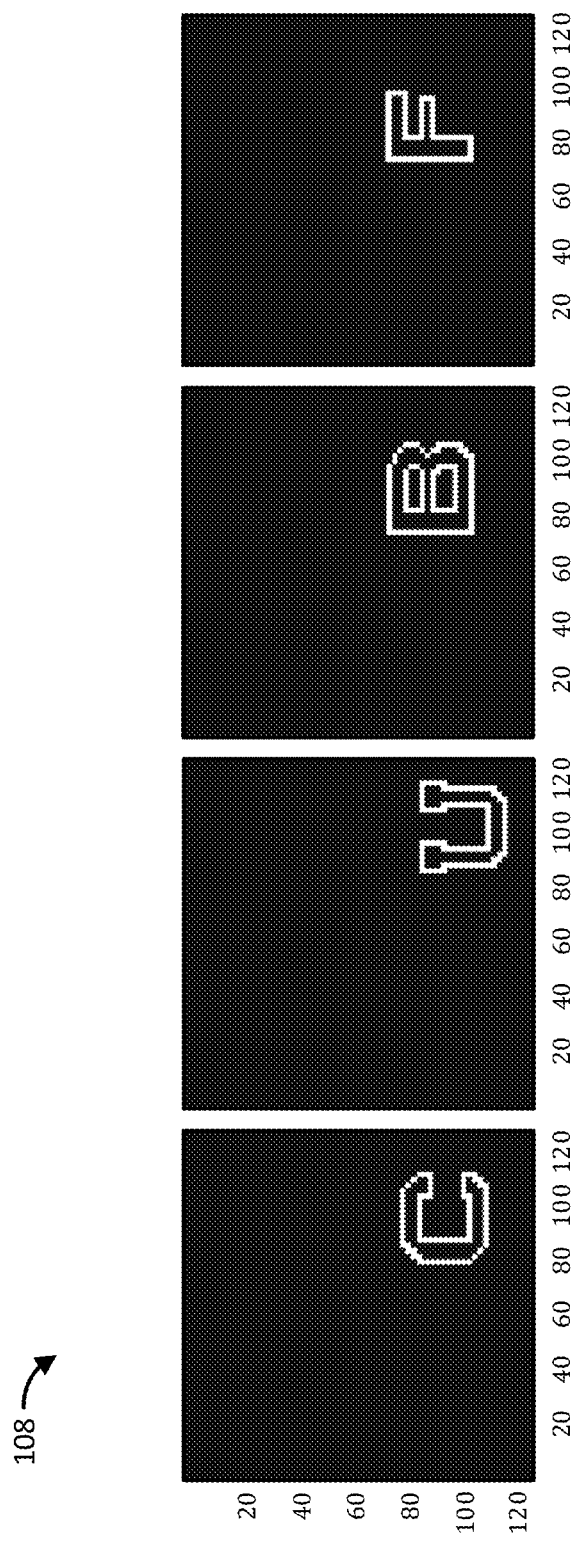
Figure 3C:
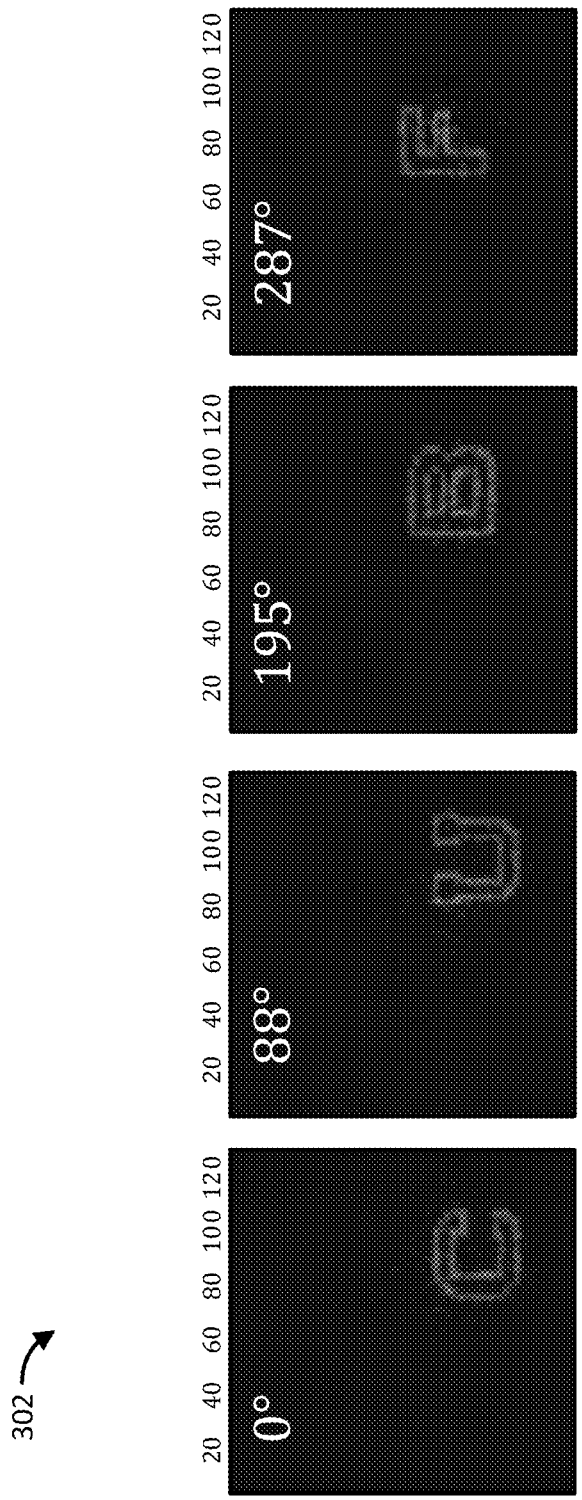

FIGS. 3A-3C depict simulation results of azimuthal multiplexing 3D diffractive optics, according to an embodiment of the present technology. FIG. 3A shows the design of two ($\phi_1$ and $\phi_2$) layers, or plates 102-1 and 102-2, of phase modulation discretized to 8 levels. FIG. 3B show target images of the 4 letters (e.g., output functions 108) to be multiplexed using plates 102-1 and 102-2. FIG. 3C shows numerical reconstructions 302 from the 3D diffractive optics of Example 1 while the second layer (e.g., plate 102-2) is rotated at angles (0°, 88°, 195°, and 287°) specified by design.

As shown in FIG. 3A, the two designed layers (e.g., plates 102-1 and 102-2) with 8 phase levels were achieved using the "soft-cut" approach. The numerical reconstructions 302 of the design with the second layer (e.g., plate 102-2) rotated at 4 encoded angles are shown in FIG. 3C. Note that the reconstruction plane for Example 1 was enlarged twice (via zero-padding of the near field) to avoid wrap-up aliasing and to take light scattering into account. The diffraction efficiency of the 4 reconstruction patterns 302 of FIG. 3C are 43.60%, 42.38%, 47.12%, and 44.83%, respectively.

Experiment and Methods

Example 1 demonstrates experimentally azimuthal multiplexing with two-layer 8 phase level diffractive optics, substantially as described above with reference to system 100 and FIG. 1. To fabricate the DOEs, each of the two layers (e.g., plates 102-1 and 102-2) were first converted to three binary amplitude masks. Along with a circular aperture on a single wafer, they were fabricated using a Heidelberg DWL 66fs mask writer. The DOE substrate was an uncoated UV fused silica precision window (Thorlabs WG41010), with 1 inch diameter and 1 mm thickness.

The substrates were first coated with 80 nm chromium using a CVC thermal evaporator. Then, chemical etching was used to take away the parts that define the aperture as well as the orientation. Next, the binary amplitude masks were used to fabricate the 8-level phase masks. The substrates were coated with AZ 4210 for 3 μm, a positive photoresist, on a spinner at the speed of 3000 rpm for 60 s. The photoresist was then pre-baked on a hotplate at 100° C. for 90 s. During the exposure process on the SUSS MJB3 mask aligner, the pattern on the binary mask allowed the photoresist on the substrate to be exposed by UV light. That induced chemical change in the exposed region which was removed after developing with 1:3 concentration of AZ400K and de-ionized water. The last step was reactive ion etching (RIE), which is suitable for removing material along the vertical direction. For Example 1, a mixture of CF4 was used for 16 standard cubic centimeters per minute (SCCM) and oxygen for 4 SCCM, which yielded an etching rate of 31 nm per minute. By proper control of the etching time, different etching depths were obtained for different exposures. The whole process was repeated 3 times for each phase mask and an 8-level modulation was achieved as a result. A discussion of this fabrication process is provided below in Example 2.

Figure 4A:
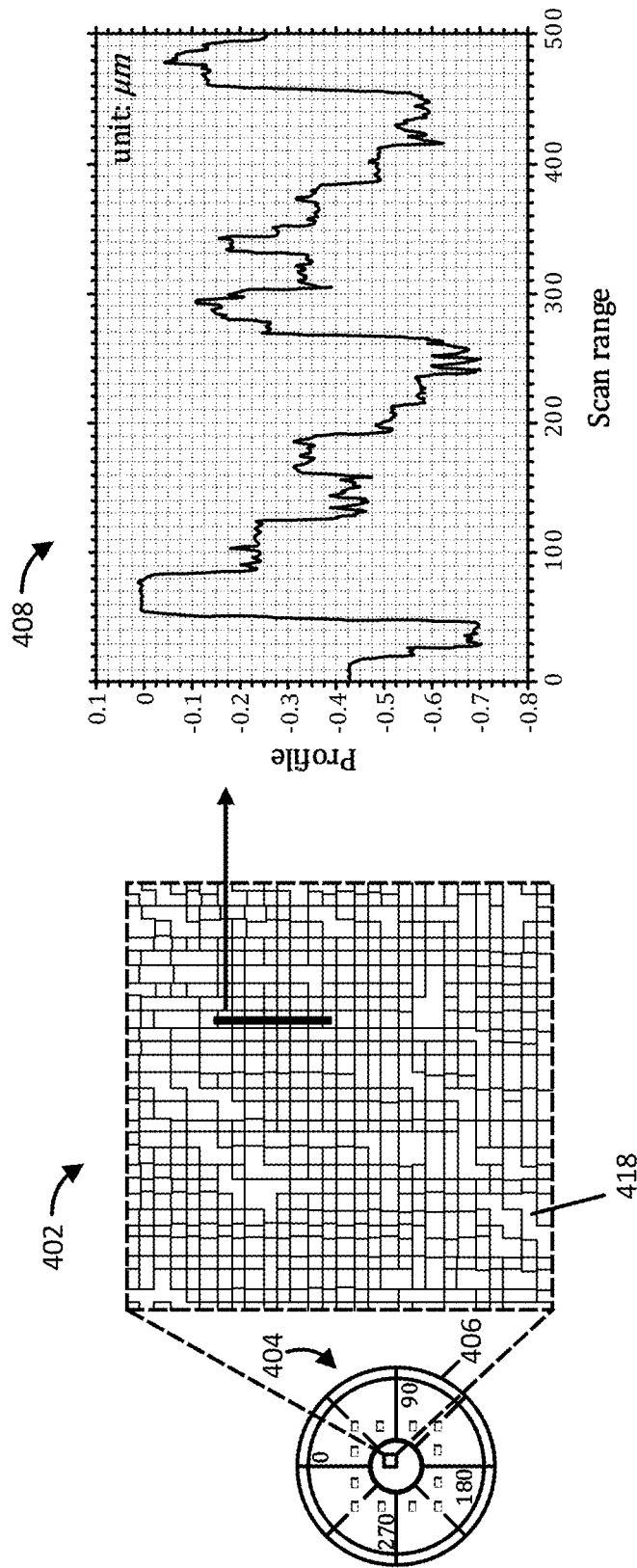
FIGS. 4A-4C depict experimental results of azimuthal multiplexing 3D diffractive optics, according to an embodiment of the present technology.
Figure 4B:
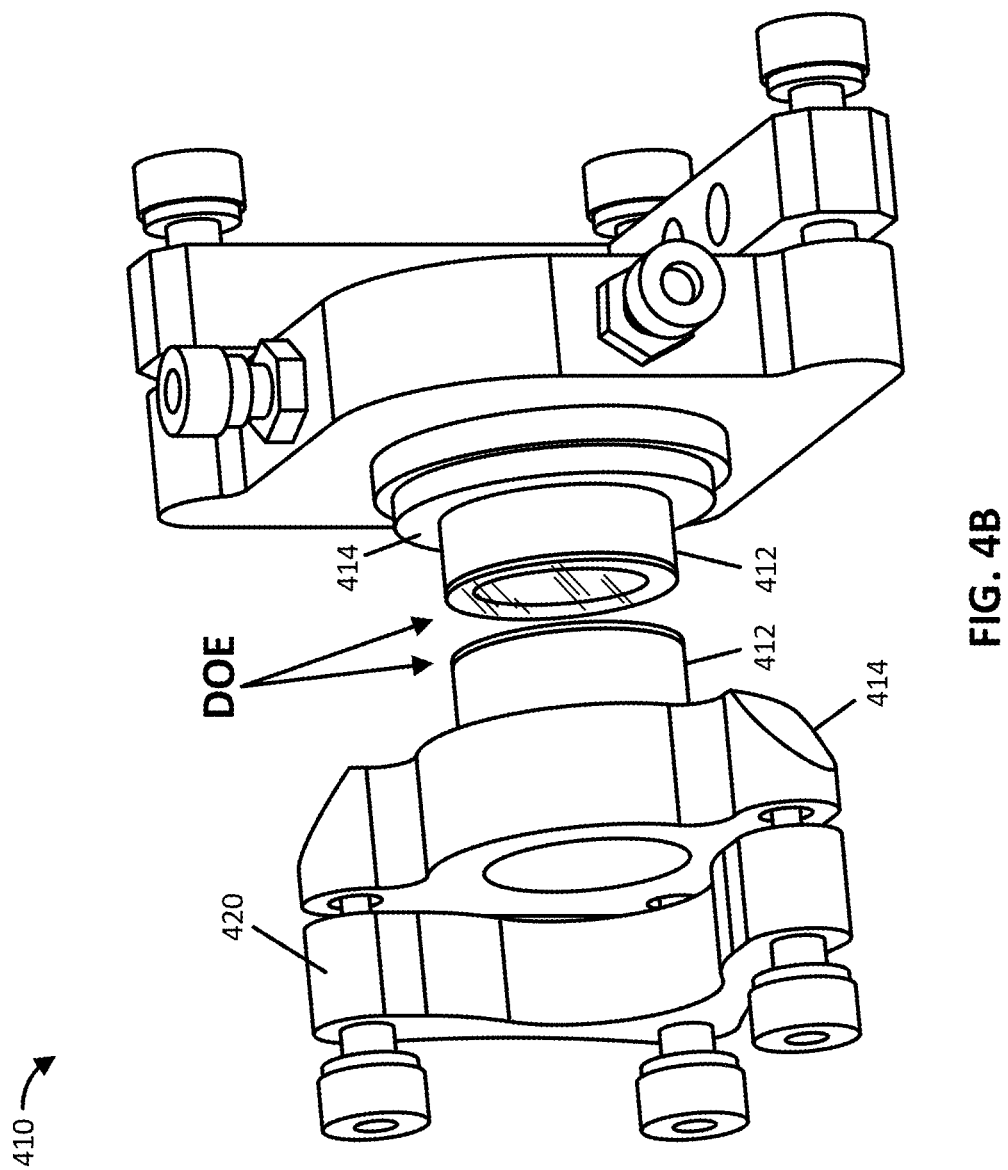
Figure 4C:
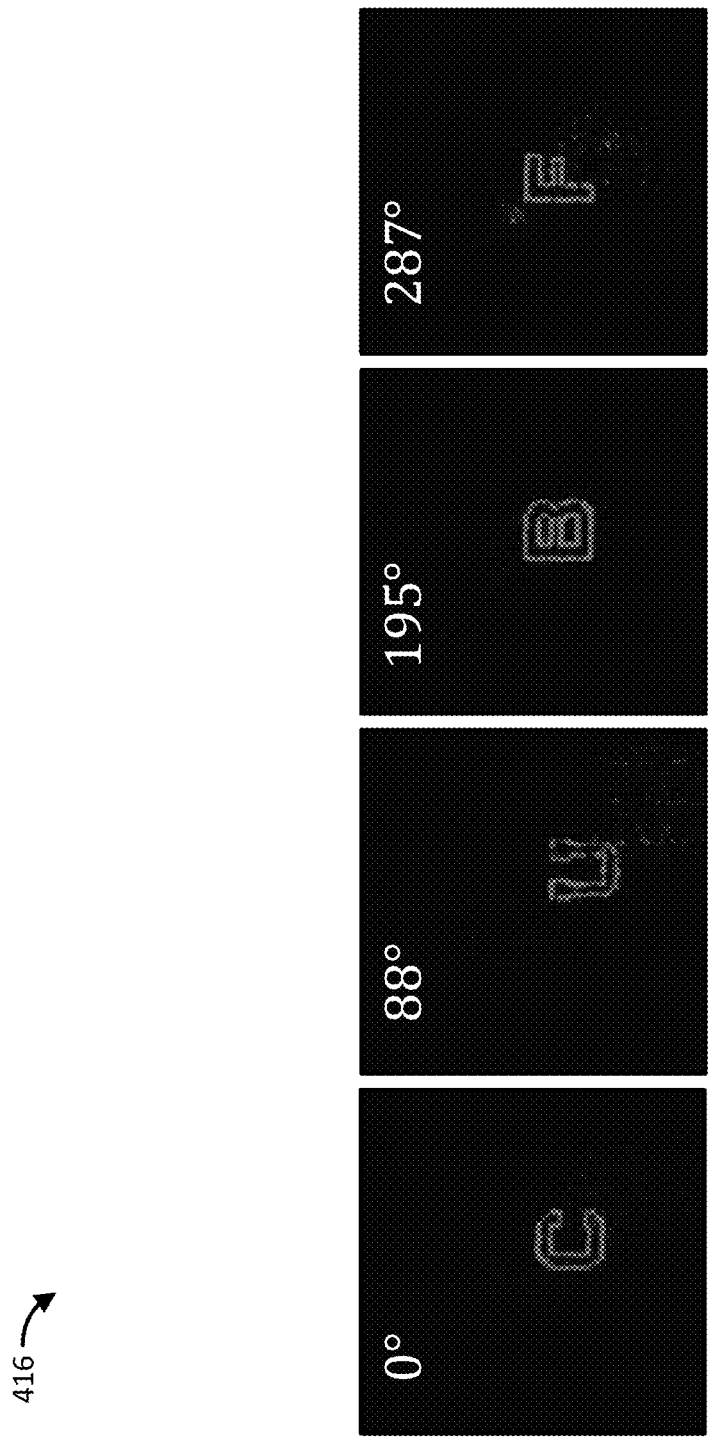

FIGS. 4A-4C depict experimental results of azimuthal multiplexing 3D diffractive optics, according to an embodiment of the present technology. FIG. 4A shows one DOE 402 fabricated using photolithography. The substrate was coated with chromium that contains markers 404 on the periphery 406 indicating orientation. The aperture encircles the layer of phase modulation at the center. The phase modulation was achieved by a 3-step exposure and etching. The plot 408 shows a characterization of the surface profile using a 1D stylus profilometer. The diffractive optics was robust as the reconstructions (e.g., 302) can still be obtained with some roughness on the surface. FIG. 4B shows the setup 410 for reconstruction. The two layers (e.g., plates 102-1 and 102-2) were attached on adaptors 412 which were secured on lens mounts 414, with the etched sides facing each other, as shown in FIG. 4B. Both layers (e.g., plates 102-1 and 102-2) were adjusted normal to the incident beam, and were separated by 1 mm ($\Delta z$). The layers (e.g., plates 102-1 and 102-2) were adjusted to be concentric by transverse shifts and were able to rotate with respect to each other. FIG. 4C shows reconstructed images 416 with threshold value 10% relative to maximum when the second layer (e.g., plate 102-2) was rotated with respect to the first layer (e.g., plate 102-1), at 0°, 88°, 195°, and 287° (the angles specified by design).

The DOE 402 shown in FIG. 4A illustrates the fabricated sample with a microscopic image of the surface after etching 3 times. It can be seen that each etching step overlaps appropriately with the help of the alignment markers, as described further in Example 2, below. The surface profile (also referred to herein as a structured or patterned surface of plates 102) was examined with a 1D stylus profilometer, where 8 phase steps were recognizable. In spite of some roughness on the surface 418, which was probably due to the non-ideal condition of the reactive ion etching (RIE), the 3D diffractive optics samples (e.g., DOE 402) were robust and the desired reconstructions were still successfully obtained in Example 1. The reconstruction setup shown in FIG. 4B used industrial grade double-sided tape to attach the two substrates (e.g., plates 102-1 and 102-2) on manually, or automatically, rotatable adaptors 412, with the etched sides facing each other (the phase pattern of one layer is mirrored left-right in the fabrication process). The two adaptors 412 were then secured on two lens mounts 414, one of which was mounted on a 3-axis translation stage 420 to provide control of tip/tilt and translation in X, Y, Z directions, and with the other providing control for the same as previous in addition to rotation (Thorlabs K6XS). Both layers (e.g., plates 102-1 and 102-2) were adjusted concentric and normal to the incident beam from light source 105, with separation distance $\Delta z$ of 1 mm as in the design. A Fourier lens was placed after the second layer (e.g., plate 102-2) with a focal length of 300 mm to yield a far-field plane of the output from the 3D diffractive optics, where a color CMOS sensor (Canon 5D Mark ii) was placed to capture the reconstructed images (e.g., 416). With spatial-filtered and collimated illumination from a He—Ne laser light source 106, the reconstructed images 416 (FIG. 4C) were obtained as the second layer (e.g., plate 102-1) was rotated to the designed angles. The measured diffraction efficiency was 33.65%, 29.28%, 36.46%, and 31.50%, respectively.

Discussion

The design approach described in above according to the present technology provided may obtain 3D diffractive optics showing azimuthal multiplexing of 4 functions with 16 layers and each layer having 1024×1024 pixels, as described below in Example 2. The diffraction was also investigated as a function of the number of pixels and the number of layers (e.g., plates 102), azimuthal selectivity, and the smallest angular interval for multiplexing to avoid crosstalk.

Figure 5A:
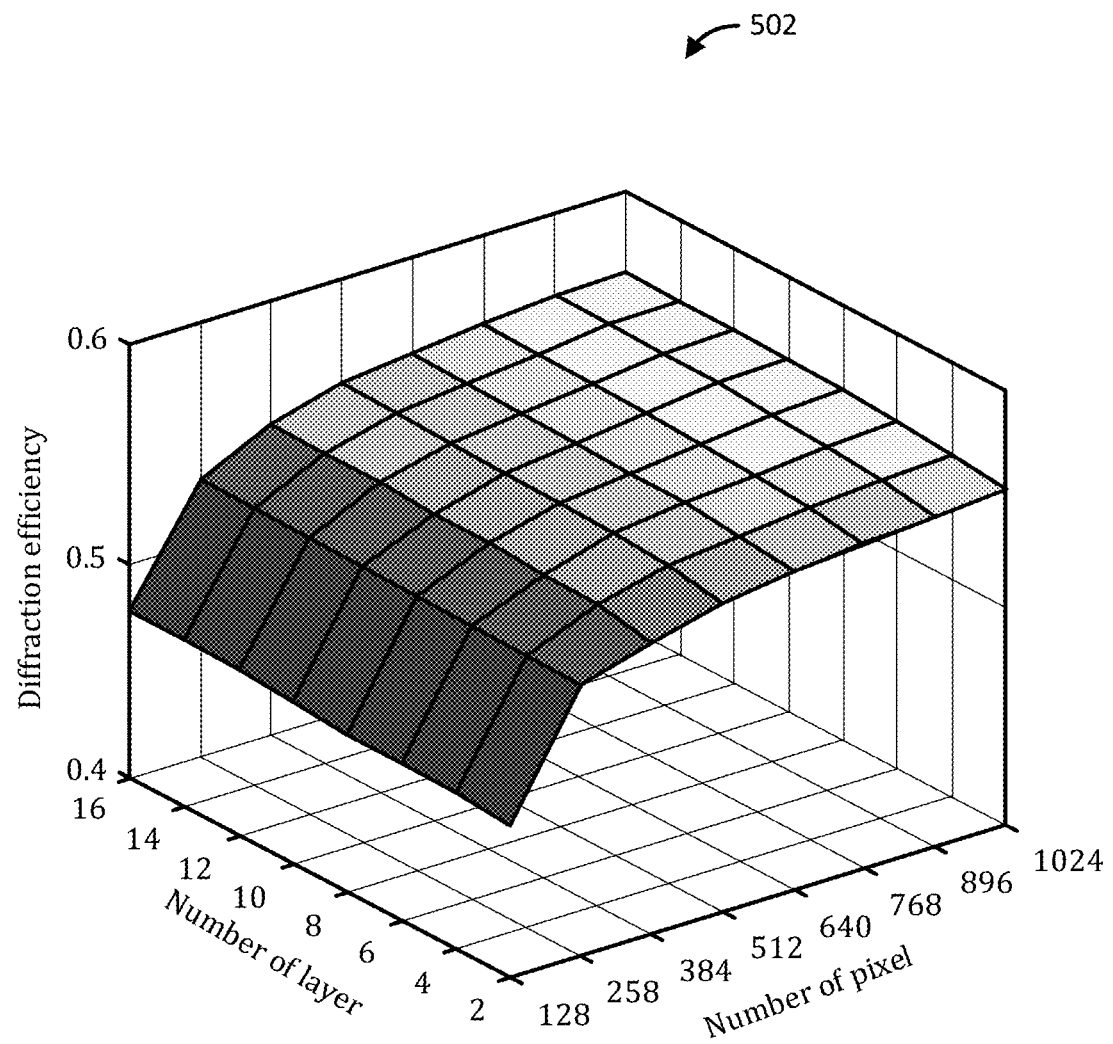
FIGS. 5A-5C depict scaling of azimuthal multiplexing 3D diffractive optics, according to an embodiment of the present technology.
Figure 5B:
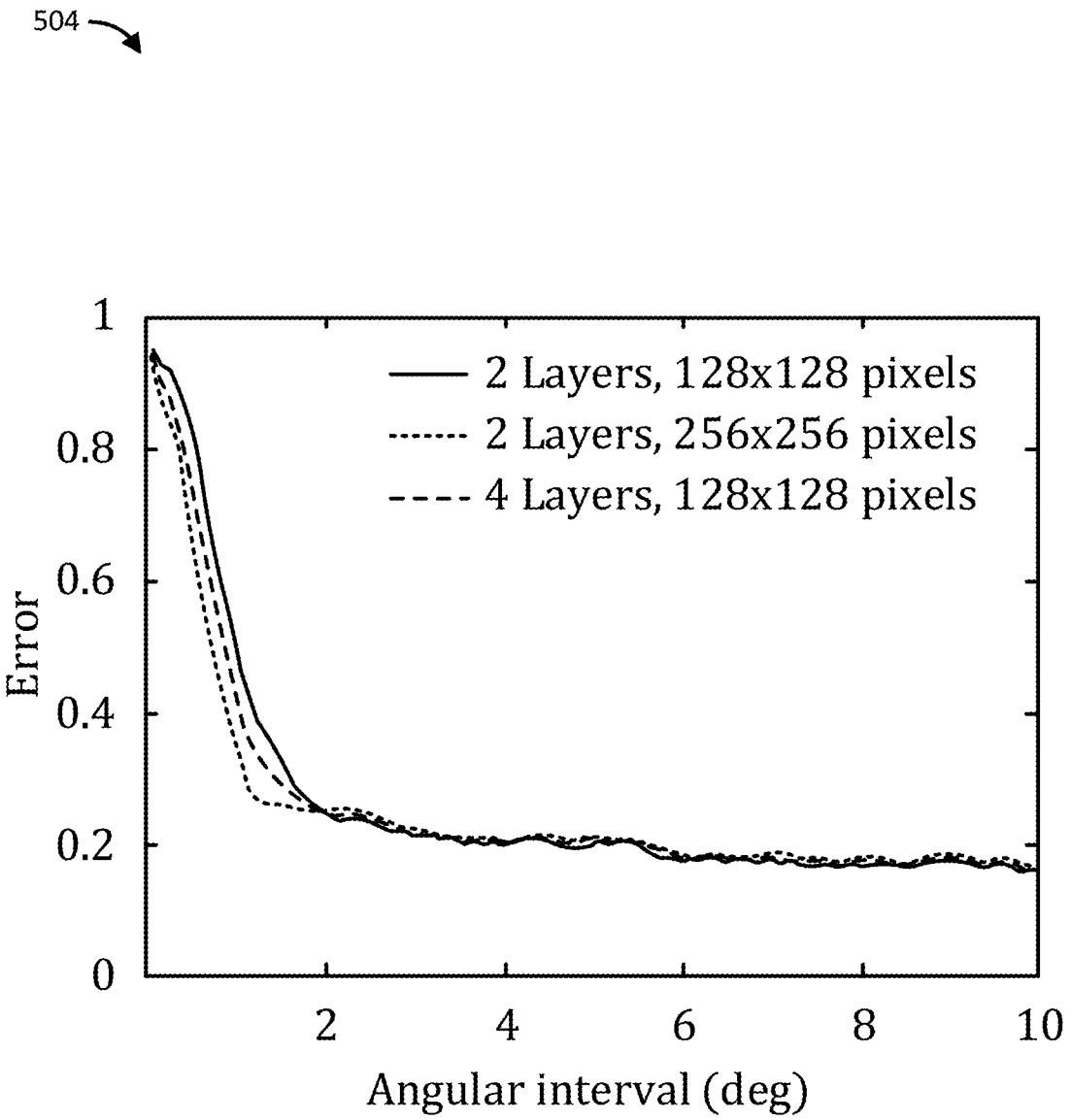
Figure 5C:
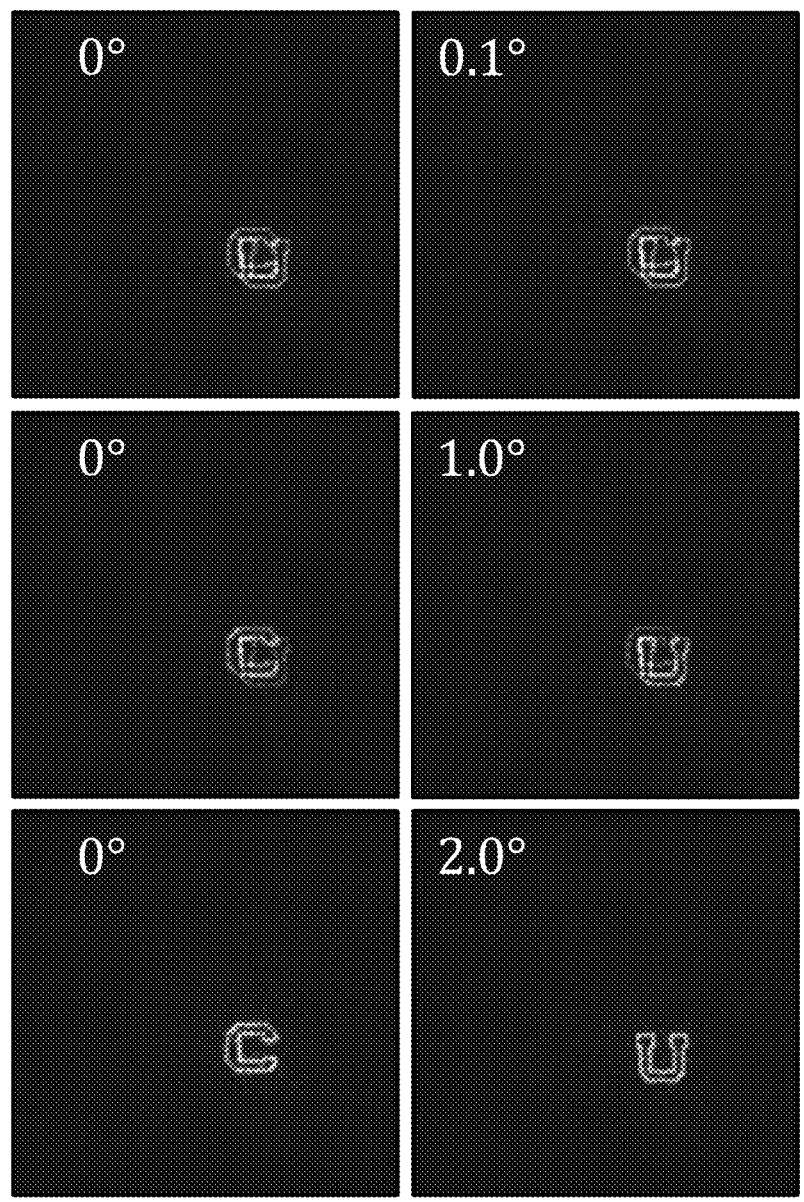

FIGS. 5A-5C depict scaling of azimuthal multiplexing 3D diffractive optics, according to an embodiment of the present technology. FIG. 5A depicts a plot 502 showing the mean of the diffraction efficiencies of "C", "U", "B", "F" as functions of the number of layers (e.g., plates 102) and the number of pixels. FIG. 5B depicts a plot 504 showing the relative error of "C" and "U" as a function of angular interval between the functions. Each point on the plots corresponds to a different design having differing numbers of layers (e.g., plates 102) and pixels. FIG. 5C shows simulated reconstructions 506 for angular intervals equal to 0.1°, 1°, and 2°, showing progressive reduction of crosstalk.

First, the effect of system parameters on the diffraction efficiency (DE) was studied. The diffraction efficiency is defined as the ratio of the intensity in the target area to the intensity of the input beam from light source 105. Four functions representing the letters "C", "U", "B", "F" were multiplexed. The number of layers was changed from 2 to 16 and the number of pixels in each layer from 128 to 1024. The mean of the 4 diffraction efficiencies was recorded and the result are shown in the plot 502 of FIG. 5A. The diffraction efficiency was enhanced by either increasing the number of layers (e.g., plates 102) or the number of pixels. However, the rate of improvement of the DE became slower with larger parameters, and saturated at some point. A longer computational time was also required when increasing the number of layers (e.g., plates 102) or the number of pixels.

Second, the minimum angular interval was investigated to avoid crosstalk. The azimuthal multiplexing scheme was applied to two functions, namely the letters "C" and "U". Their angular interval was changed from 10° to 0.1°, at decrements of 0.1°. The relative error was used—defined as the ratio of the intensity outside the target area to the one in the target area—to evaluate the quality of the reconstructions. The result is shown in the plot 504 of FIG. 5B. The error was higher as the angular interval was decreased, with no crosstalk, partial crosstalk, and complete crosstalk, as shown in the reconstructions 506 of FIG. 5C. A smaller angular interval without crosstalk was obtained by either increasing the number of layers or the number of pixels.

Figure 6A:
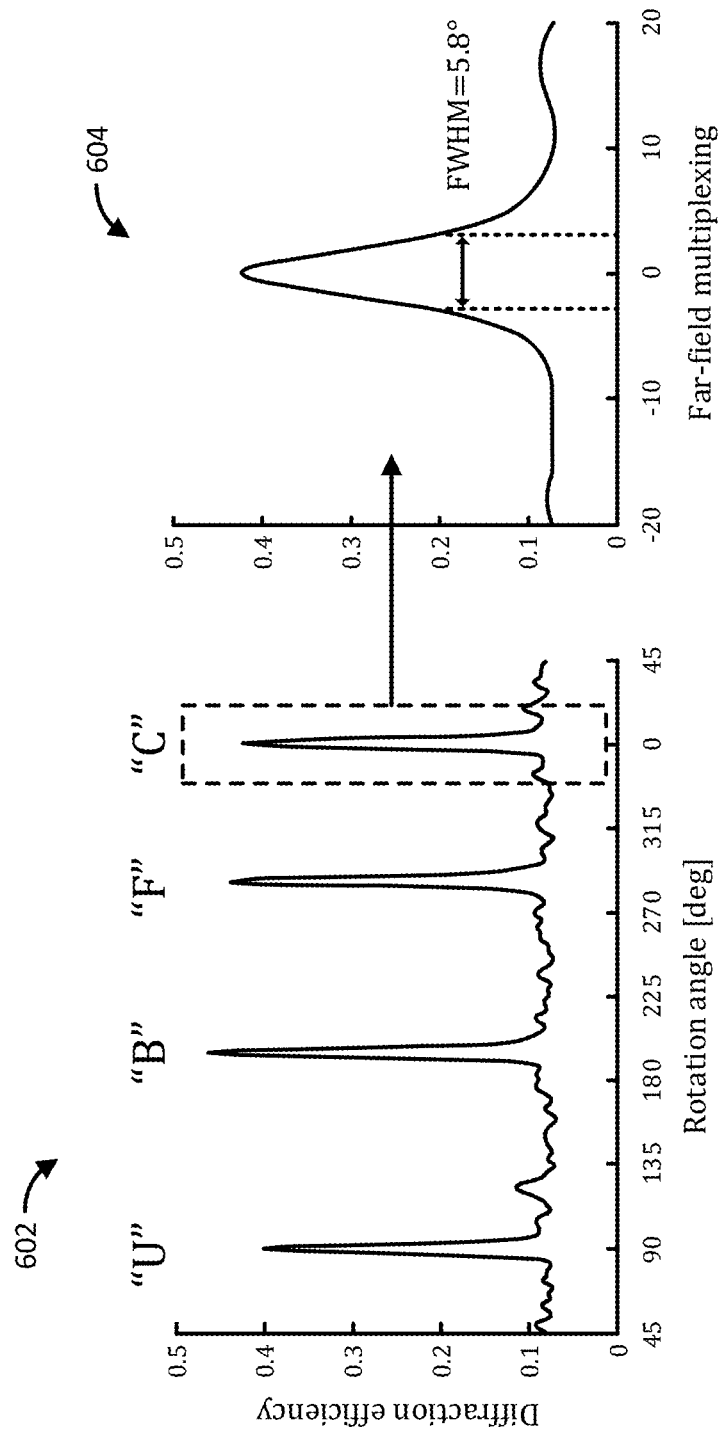
FIGS. 6A and 6B show azimuthal selectivity of 3D diffractive optics, according to an embodiment of the present technology.
Figure 6B:
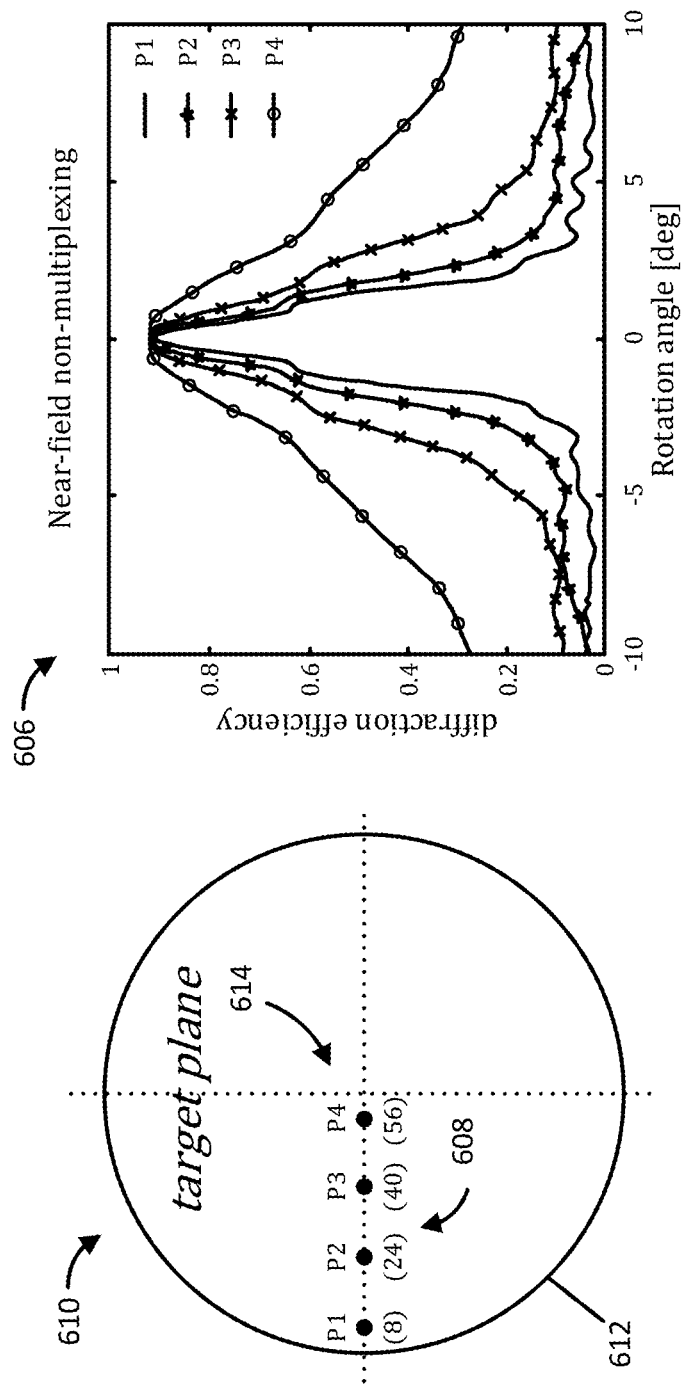

FIGS. 6A and 6B show azimuthal selectivity of 3D diffractive optics, according to an embodiment of the present technology. FIG. 6A depicts a plot 602 of the diffraction efficiency as a function of rotating angle of the second layer (e.g., 102-1) with respect to the first layer (e.g., 102-2_. As shown in plot 604, the full width at half maximum (FWHM) of each single reconstruction patterns were between 5° to 6°. FIG. 6B depicts a plot 606 showing the azimuthal selectivity in the near-field for 4 point targets 608 located radially on the target plane 610. The point closer to the edge 612 had better selectivity than the one close to the center 614, indicating the azimuthal selectivity in the near-field depends on target location.

Azimuthal multiplexing is an important functionality enabled by the 3D diffractive optics according to the present technology. The azimuthal selectivity is the angular interval where the reconstructed patterns are still recognizable. A direct sense of multiplexing system performance can be perceived in FIG. 3C. For the design described above, The second layer (e.g., plate 102-2) was rotated 360° with respect to the first layer (e.g., plate 102-1_, and the diffraction efficiency of the 4 encoded patterns around their design angles was recorded, as shown in FIG. 6A. The FWHM of one reconstruction was between 5° to 6°.

The selectivity in the near-field was also investigated in the non-multiplexing case. To simplify, 4 points were used as the targets. They were located at the 8th, 24th, 40th, and $56^{th}$ column in the 128 column target plane. The parameters of the 3D diffractive optics were the same as previous case, except the reconstruction was at 50 μm after the second layer (e.g., plate 102-2). The selectivity of the 4 points as the second layer (e.g., plate 102-2) was rotated in a ±10° at the increment of 0.1° is shown in plot 606 of FIG. 6B. The azimuthal selectivity in the near-field was found to depend on the location of the target, e.g., the targets closer to the edge 612 had better selectivity than the ones closer to the center 614. The reason may be that as the layer (e.g., plate 102) rotated, the induced pixel changes were proportional to the radial values.

Conclusion

Example 1 elaborated on the concept of azimuthal multiplexing and demonstrated an approach to design and implement it with 3D diffractive optics in accordance with the present technology. This is achieved by a stratified DOEs layout with iterative optimization algorithms (e.g., algorithm 200). As a result, arbitrary optical information can be encoded azimuthally in the 3D diffractive optics and retrieved by rotating part of its components relative to the others. As a special case, one can encode different functions by rotating the input wavefront relative to a diffractive optics device. The designs are not based on weakly scattering or the Born approximation enabling for multiple forward scattering events while neglecting the weak backward scattering. This enables higher flexibility and efficiency through the use of high index contrast diffractive layers, or plates 102. The fundamental opportunities and limitations were analyzed, while the experiments using photolithography confirmed the predicted performance.

The results of Example 1 further showed that extending diffractive optics from two dimensions to three dimensions enables new multiplexing opportunities. Rather than the traditional use of cascaded diffractive optical elements to encode amplitude and phase, the layered 3D diffractive optics (e.g., system 100) of the present technology provides a computationally designed volumetric structure that enables multiplexing. This is the result of multiple independent spatial mode channels being established between the input (incident light from light source 105) and the output 113 of the system, reducing the dimensional mismatch essential to the control of light fields in multiple dimensions (spatial, spectral, temporal, or coherence function). The approach also provides a different perspective on 3D diffractive optics design and further contributes to the inverse problem community by solving the nonlinear inverse problem to achieve a given task using azimuthally rotating phase layers, or plates 102.

A number of applications of azimuthal multiplexing 3D diffractive optics can be envisaged that require switching of different outputs 113 (e.g., output light states) by rotation of one layer (e.g., one plate 102), or the input field. For instance, information security is a critical issue in optical communication network systems to prevent data acquisition from unauthorized personnel. Hence, the proposed azimuthal optical multiplexing could be applied in information encryption and authentication. The complexity of deciphering the code would increase exponentially as more layers (e.g., plates 102) are employed in the 3D diffractive optics (e.g., system 100). In a different application, it is intriguing to analyze the relation between azimuthal multiplexing and the generation of beams with orbital angular momentum associated with azimuthal phase functions. Such beams have been applied in optical trapping, quantum key distribution, optical communications, and stimulated emission depletion microscopy.

Example 2

Example 2 presents additional details regarding system 100 according to the present technology, including expansion of the design method to large volumetric 3D diffractive optics, comparison of different phase discretization methods, and detailed description of the photolithography fabrication method used in the experiment.

Demonstration of Design with Large Volumetric Space-Bandwidth

The design method according to the present technology can be extended to obtain results for large volumetric space-bandwidth devices. For Example 2, a 3D diffractive optics was designed consisting of 16 layers, with 1024×1024 pixels in each layer, or plate 102. This embodiment of system 100 provided azimuthal multiplexing of four functions representing the letters "C", "U", "B", "F", each appearing when the last layer, or plate 102, was oriented at 0°, 88°, 195°, and 287°.

Figure 7A:
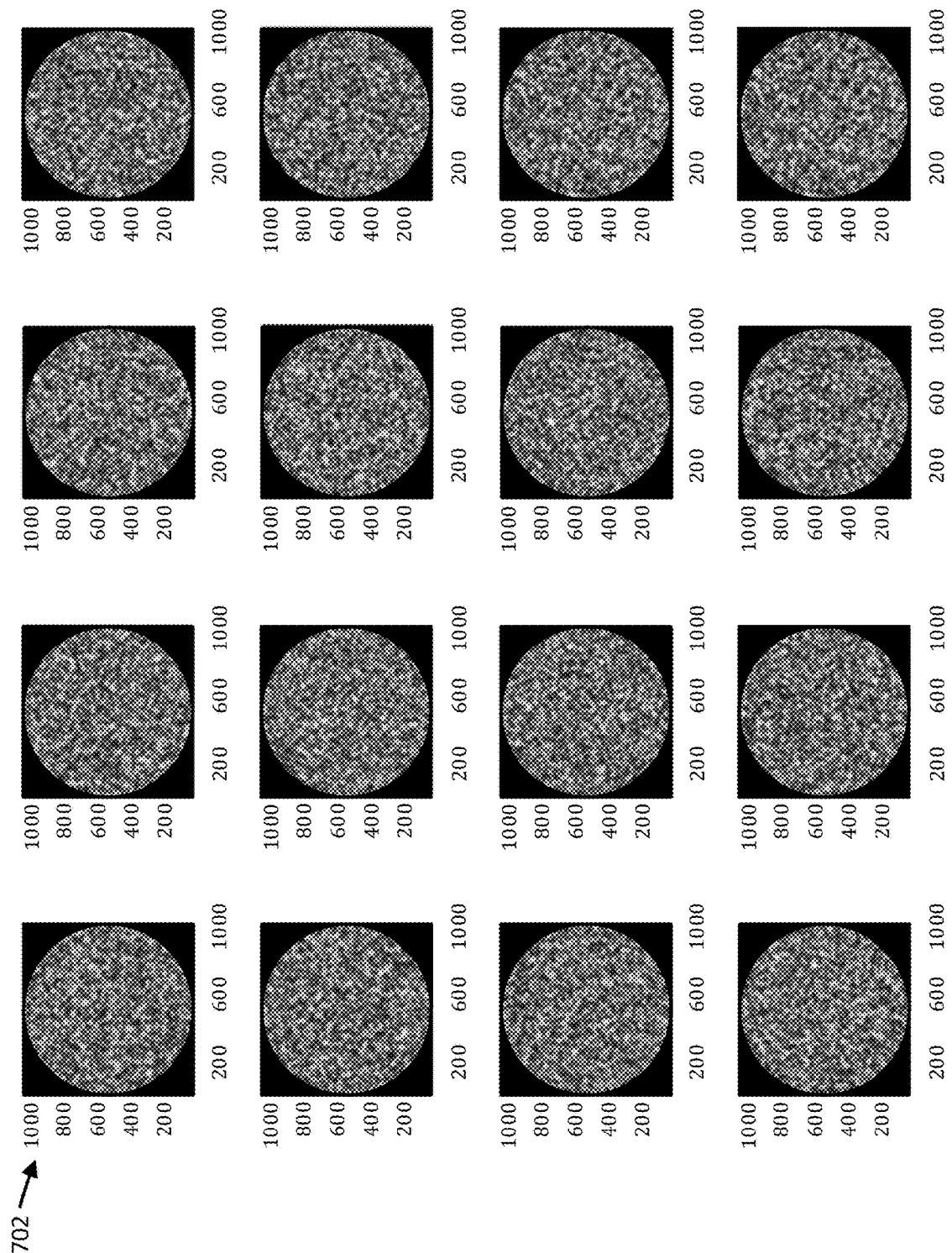
FIGS. 7A and 7B depict a demonstration design of azimuthal multiplexing 3D diffractive optics with large volumetric space-bandwidth product, according to an embodiment of the present technology.
Figure 7B:
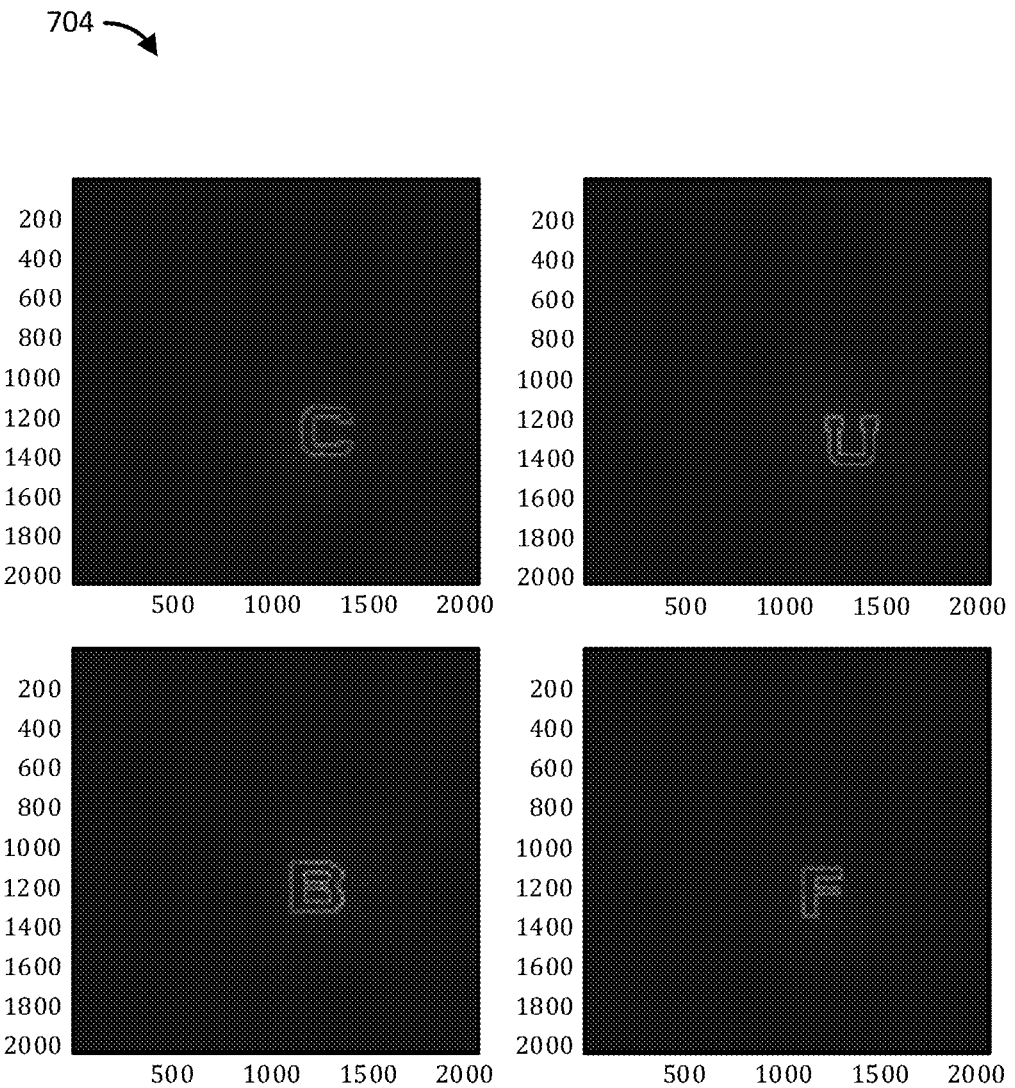

FIGS. 7A and 7B depict a demonstration design of azimuthal multiplexing 3D diffractive optics with large volumetric space-bandwidth product, according to an embodiment of the present technology. FIG. 7A shows azimuthal multiplexing 3D diffractive optics with 16 layers (e.g., plates 102) and 1024×1024 pixels in each layer, or plate 102. FIG. 7A further shows 16 design phase patterns 702 with 8 quantization levels. The calculation was completed within 24 hours on a PC with Intel-Core i7-8700 CPU at 3.2 GHz and 16 GB RAM. FIG. 7B shows reconstructed patterns 704 when the last layer was rotated at 0°, 88°, 195°, and 287°. The diffraction efficiencies were improved to 55.95%, 56.32%, 60.46%, 52.50% for each reconstructed pattern 704 (FIG. 7B).

Generation of Gray Level Objects and Phase Objects

Figure 8A:
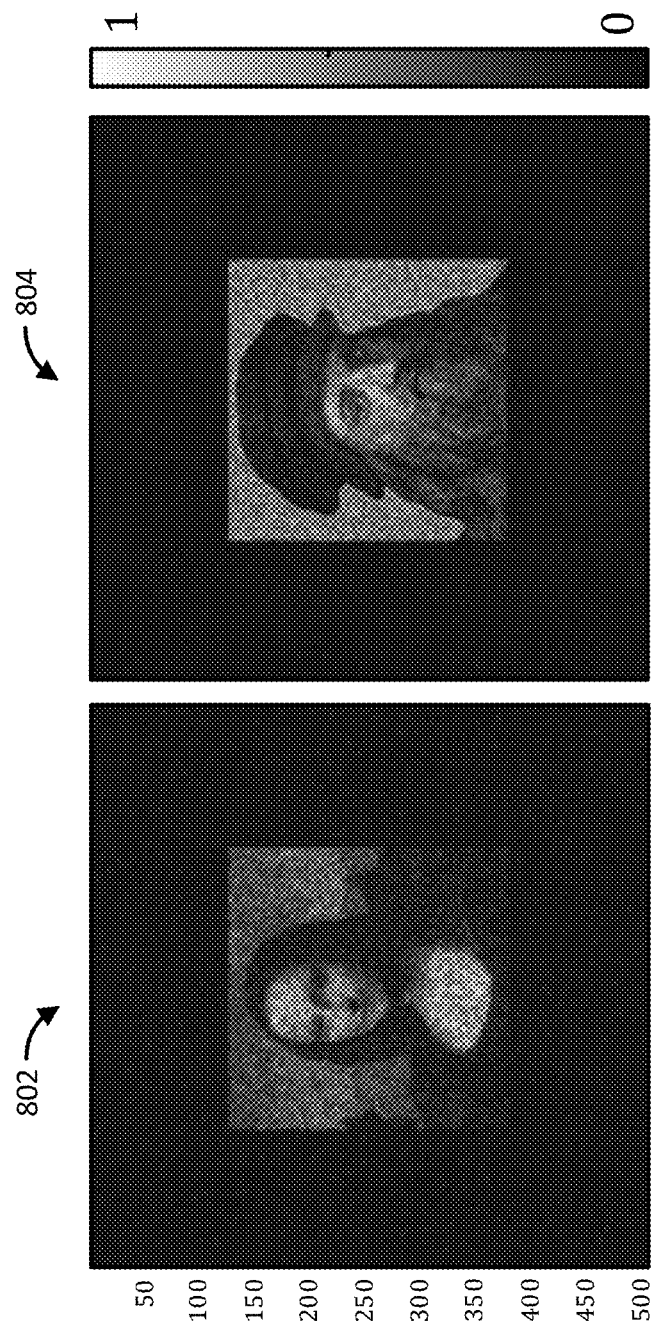
FIGS. 8A and 8B depict a demonstration of generating gray object and phase object, according to an embodiment of the present technology.
Figure 8B:
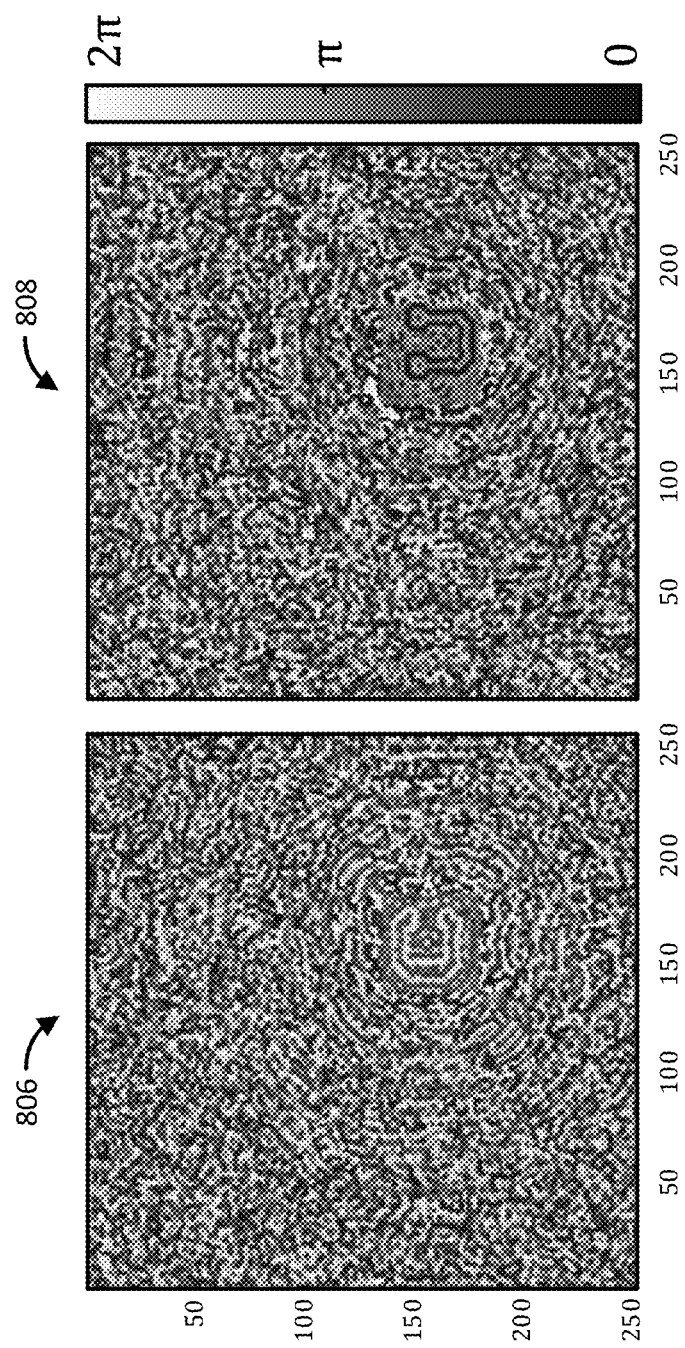

FIGS. 8A and 8B depict a demonstration of generating gray object and phase object, according to an embodiment of the present technology. FIG. 8A shows two gray images (802, 804) that were multiplexed by the 3D diffractive optics (e.g., system 100) designed in accordance with the present technology. FIG. 8B show two phase images (806, 808) that were multiplexed by the 3D diffractive optics (e.g., system) designed in accordance with the present technology.

In Example 2, the class of devices capable of generating gray objects and phase objects are discussed. Two images—Mona Lisa 802 and Da Vinci 804—were encrypted and each consisted of 256×256 pixels. The 3D diffractive optics used for this purpose had two layers (e.g., plates 102) with 512×512 pixels in each layer (e.g., plate 102), and was designed in such a way that when the second layer (e.g., plate 102-2) was at its original position, the profile photo of Mona Lisa showed up, while when the second layer (e.g., plate 102-2) was rotated clockwise by 90°, the profile photo of Da Vinci showed up. The reconstructed images 802 and 804 are shown in FIG. 8A. The speckled images may have originated from the nature of computer-generated 3D diffractive optics of diffusively scattering objects.

In general, systems (e.g., 100) designed and used according to the present technology) are capable of generating phase objects as well. However, it should be noted that for phase objects, the condition for the convergence of the algorithm (e.g., 200) is often stricter, namely harder to achieve due to the lower number of free parameters available once the amplitude and phase are imposed. The reason may be that when imposing amplitude constraints, the phase is a free parameter, while also the amplitude outside the target area (e.g., 610) is a free parameter. Both conditions help the algorithm converge. When the phase is the constraint, the amplitude is uniform by default, which means there are fewer free parameters.

A uniformed amplitude was encoded in a small window around the letter "C" and "U", where the phase values on the two letters are 1.57 and 0.57, respectively. That information was encoded in two layers (e.g., 102-1 and 102-2) of the 3D diffractive optics (e.g., system 100) with 128×128 pixels in each layer (e.g., plates 102-1 and 102-2). This embodiment of system 100 had 3D diffractive optics that were capable of being switched depending on the orientation of the second layer, or second plate 102-2 (the phase letter "C" shows up in image reconstruction 806 when the second layer is at its original position, while the letter "U" shows up in image reconstruction 808 when the second layer is rotated clockwise by 90). FIG. 8B shows the phase value on the reconstruction plane for the two cases 806 and 808.

Diffractive Optics Implementation Methods Overview

There are various ways to implement the DOEs designed according to the present technology. A widely used method is via spatial light modulators (SLMs), which allows for easy and fast display of phase patterns with 8 bit resolution (256 grey levels) on LCD panels. However, SLMs are polarization sensitive and thus they suffer from substantial loss of energy. Moreover, they are 2D devices and are thus not suitable for implementing 3D diffractive optics unless cascaded or creating a folded system. Alternative methods generate surface relief structures in an optically transparent material such as glass, quartz, or polymer, and include ion beam etching, direct diamond tuning, gray-level lithography, and multi-step binary exposure photolithography. For this portion of Example 2, each layer, or plate 102, of the 3D diffractive optics was fabricated using a photolithographic method. To approximate a continuous surface profile, the lithography process was repeated M times to yield a discrete structure with $2^M$ steps. Here, 8 phase levels were used, and accordingly 3 amplitude masks were needed for the fabrication. The phase modulation induced by the depth change is given by $$h(x, y) = \frac{\lambda}{n(\lambda) - 1} \frac{\phi(x, y)}{2\pi}, \quad (7)$$

where λ is the wavelength of operation and n is the refractive index.

Phase Quantization Methods

Figure 9:
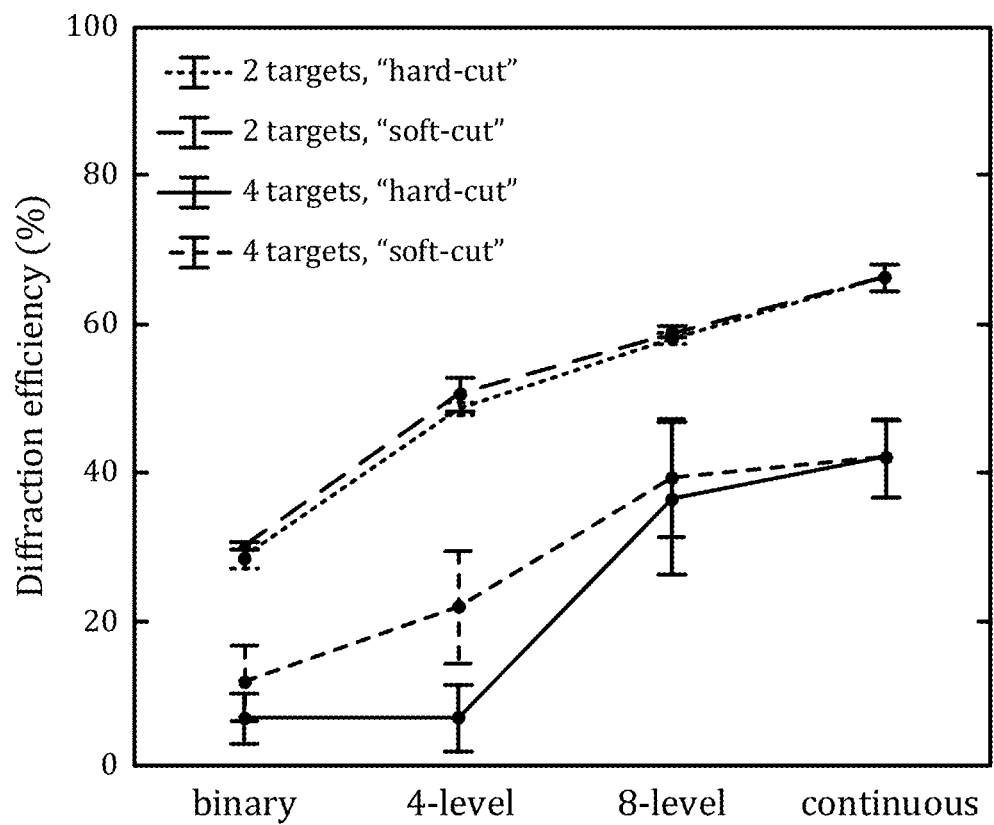
FIG. 9 depicts a comparison of diffraction efficiency of azimuthal multiplexing 3D diffractive optics designs using different phase discretization methods and number of targets to be multiplexed, according to an embodiment of the present technology.

FIG. 9 depicts a plot 902 providing a comparison of diffraction efficiency of azimuthal multiplexing 3D diffractive optics designs using different phase discretization methods and number of targets to be multiplexed, according to an embodiment of the present technology. To prepare for the fabrication, it was necessary to discretize the phase values in the design. In particular, 8 etching depths were allowed, which corresponded to phase values of 0, 1/4 π, 1/2 π, 3/4 π, π, 5/4 π, 3/2 π, and 7/4 π. One common quantization method is "hard-cut" where, at each iteration, the phase values are compelled to the closest allowed values. Here, in contrast, a "soft-cut" method was used to improve the coding. In this method, during the iterative optimization, the design phase values are allowed in a region around the preset values. These regions shrank after each iteration until only 8 phases were allowed in the end. In order to evaluate the performance of this phase discretization method, azimuthal multiplexing 3D diffractive optics were designed consisting of two layers, or plates 102, with 128×128 pixels in each layer (e.g., plate 102). In one case, two functions—namely "C" and "U"—were designed with 0° and 90° of the rotation angle of the second layer (e.g., 102-2). In another case, four functions—"C", "U", and "B", "F"—were designed with 0°, 88°, 195°, and 287°. The diffraction efficiencies are shown in plot 902 of FIG. 9.

Photolithography Method

Figure 10A:
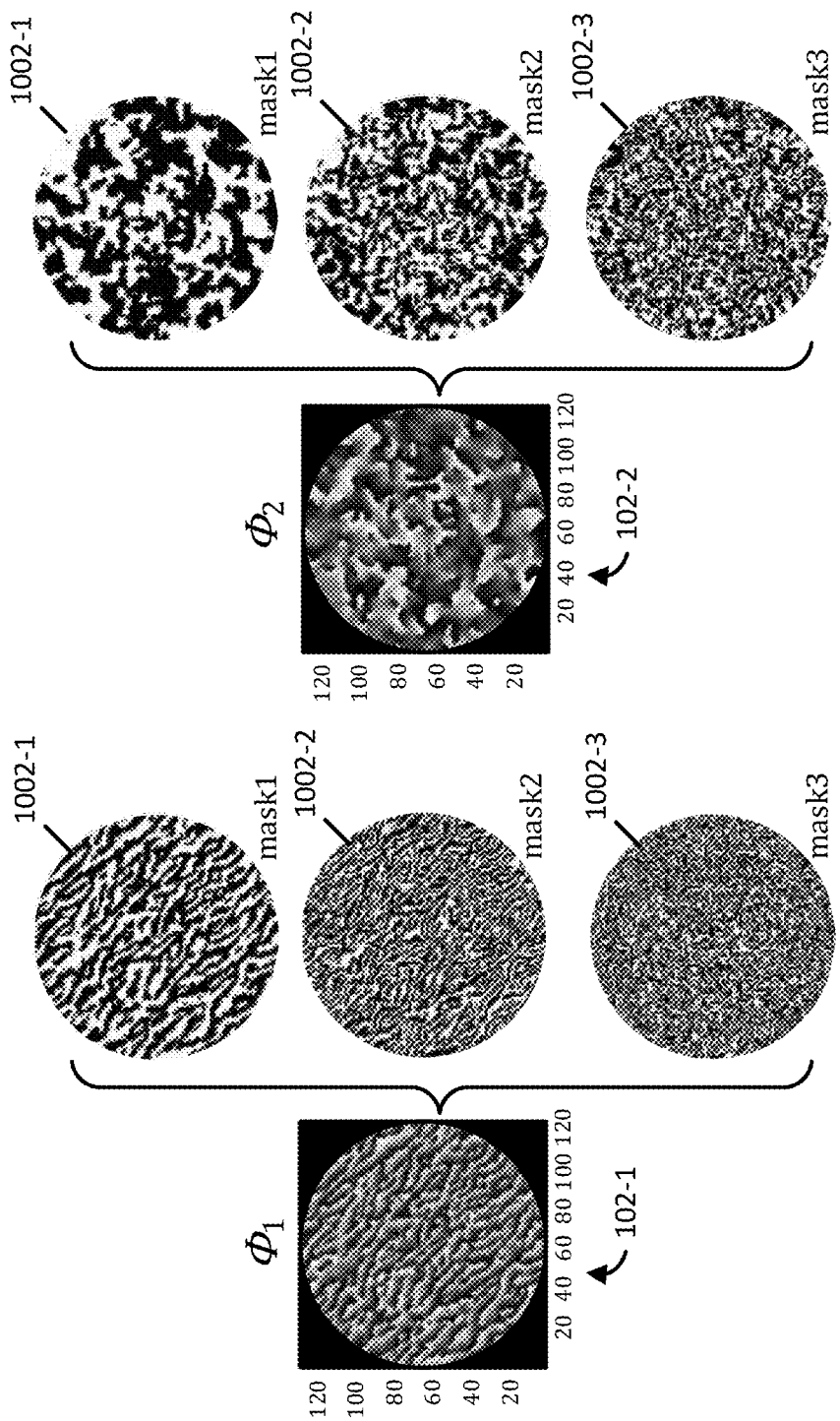
FIGS. 10A and 10B depict binary amplitude mask designs for 3D diffractive optics, according to an embodiment of the present technology.
Figure 10B:
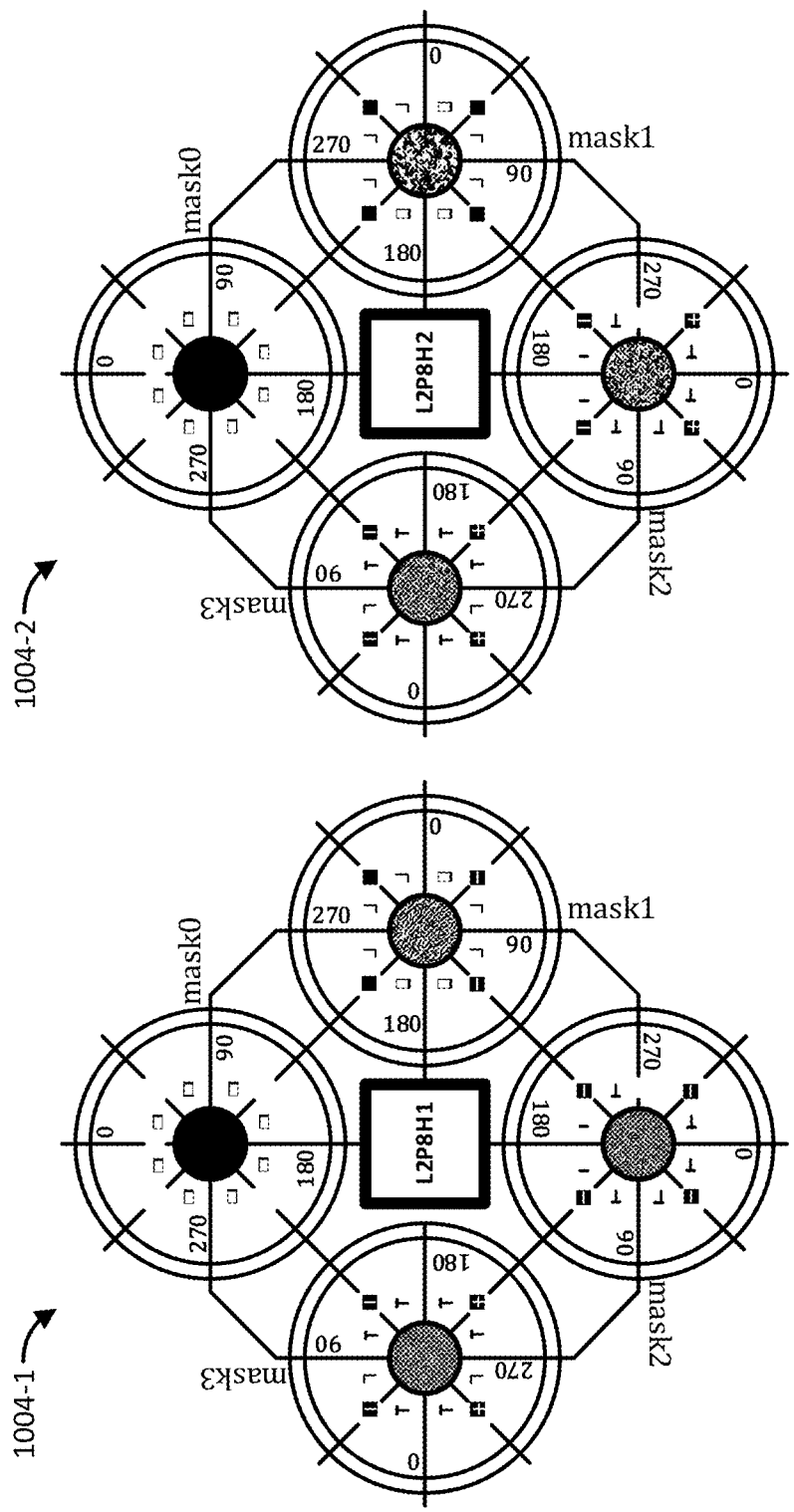

FIGS. 10A and 10B depict binary amplitude mask designs for 3D diffractive optics, according to an embodiment of the present technology. FIG. 10A show each of the two 8-level phase masks are generated by three binary masks. FIG. 10B show the three binary masks (e.g., masks 1-3 of plates 102-1 and 102-2) are arranged on a same wafer with another mask defining aperture and orientation angles. The design was fabricated using Heidelberg 66FS mask writer.

With the soft-cut method imbedded in the design algorithm, two layers (e.g., plates 102-1 and 102-2) of azimuthal multiplexing 3D diffractive optics were obtained in an embodiment of system 100. Each of the two layers, or plates 102-1 and 102-2) had 8 phase levels, thus respectively requiring 3 binary masks (e.g., masks 1-3, denoted 1002-1, 1002-2 and 1002-3 in FIG. 10A), as shown in FIG. 10A. The three binary masks (e.g., masks 103) were then arranged together with another mask (e.g., mask 0) defining the aperture and orientation angles on respective single wafers (e.g., 1004-1 and 1004-2) with a size of 4 inch by 4 inch (FIG. 10B). It should be pointed out that the second layer (e.g., 102-2) was horizontally inverted in this embodiment of system 100, since the two substrates were etched on their edges and placed facing each other during the reconstruction. It was also found to be crucial that the 3 binary masks be aligned at the exact same location during the exposure process.

Figure 11A:
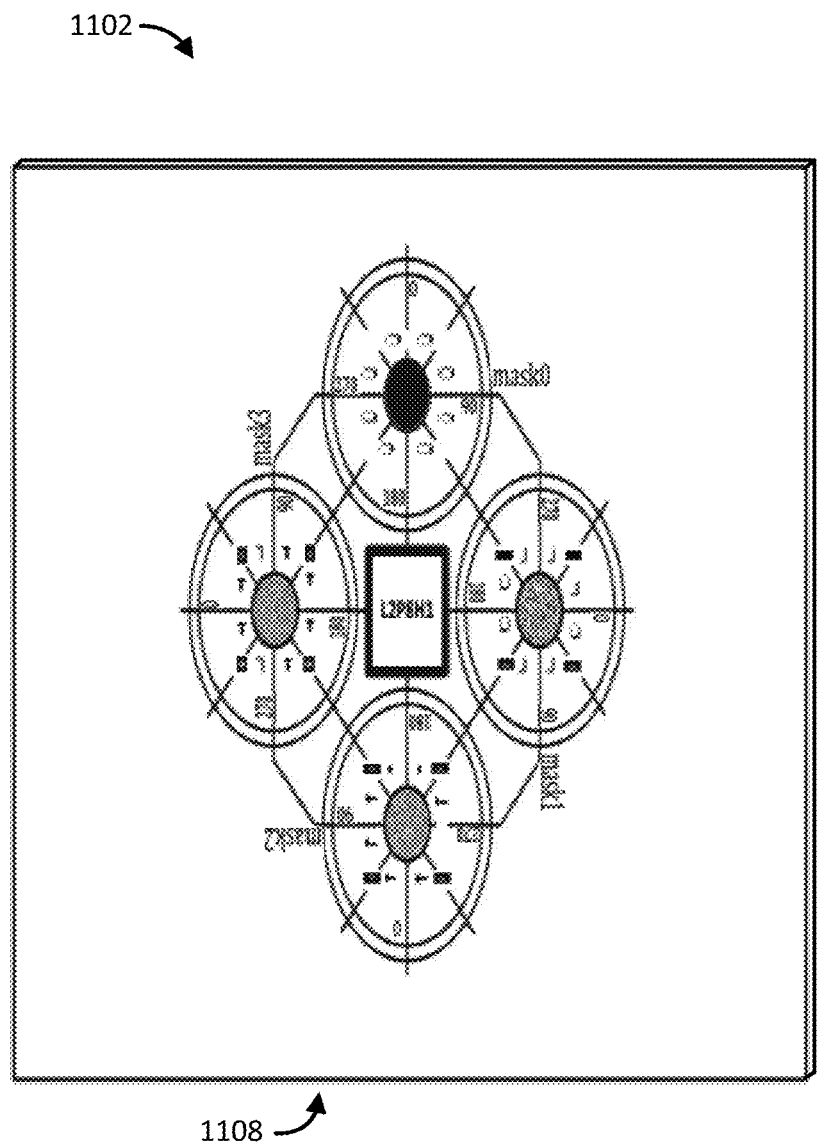
FIGS. 11A-11C depict examples of fabrication of diffractive optical elements using photolithography, according to embodiments of the present technology.
Figure 11B:
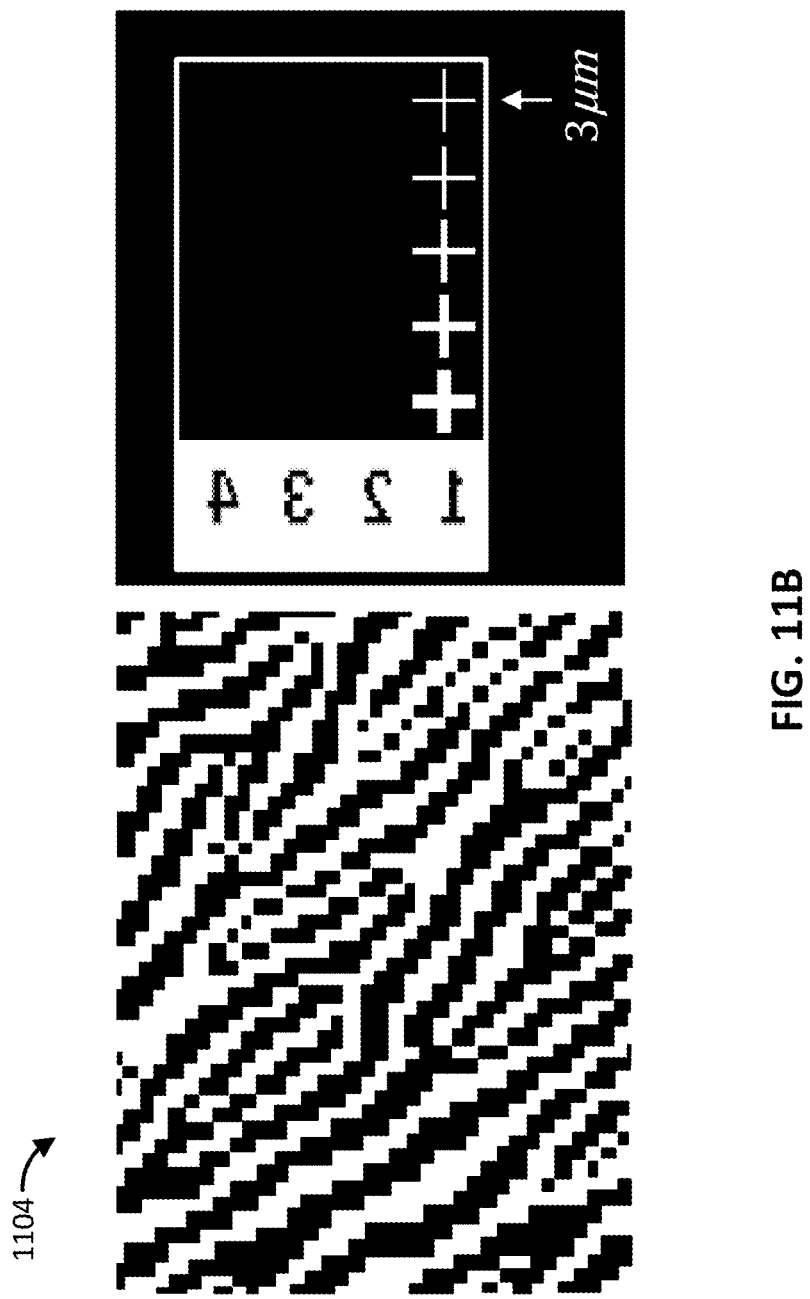
Figure 11C:
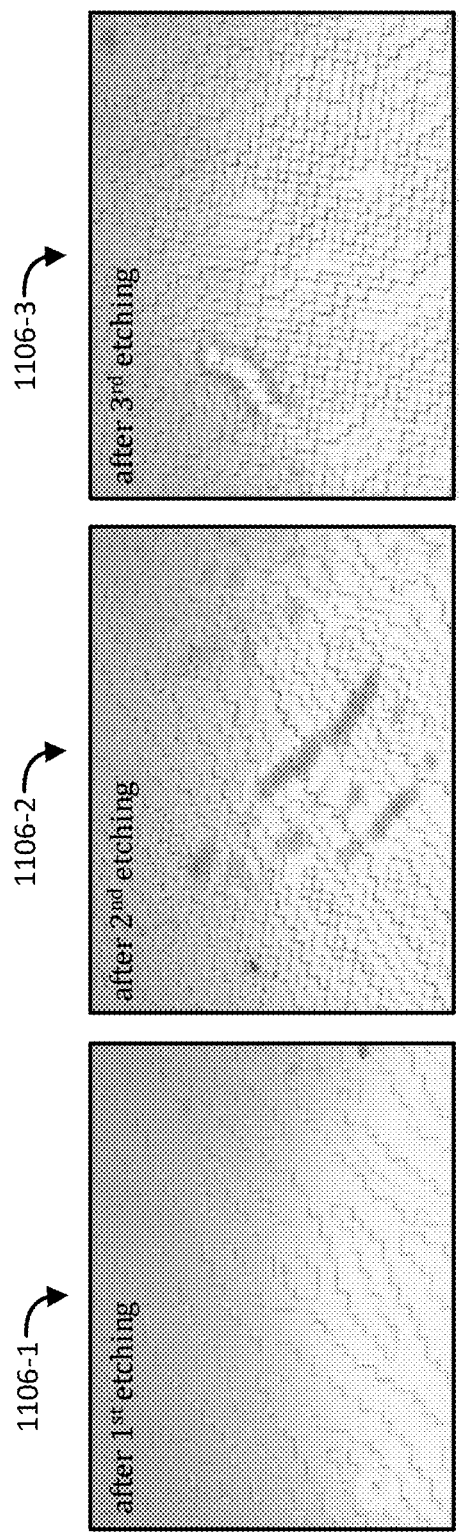

FIGS. 11A-11C depict examples of fabrication of diffractive optical elements using photolithography, according to embodiments of the present technology. To facilitate that, several alignment markers, coarse and fine, were embedded around the modulation area. The wafer 1102 was fabricated with a Heidelberg DWL 66FS (FIG. 11A), and the examination under microscope 1104 showed good quality structures (FIG. 11B). The microscopic images (1106-1, 1106-2 and 1106-3) of the sample after each etching showed precise alignment of binary masks during each exposure (FIG. 11C). FIGS. 11A-11C further depict the DOE 1108 used in this embodiment of system 100 as fabricated using photolithography. FIG. 11A further shows binary masks (1002-1, 1102-2 and 1102-3, schematically depicted in FIG. 10B) as fabricated by a Heidelberg 66FS mask writer. FIG. 11B further shows microscope images of the fabricated binary masks (1002-1, 1102-2 and 1102-3. The binary masks ((1002-1, 1102-2 and 1102-3) aligned well during each exposure/etching, as shown in FIG. 11C by the microscope images (1106-1, 1106-2 and 1106-3) after each of the three etching processes.

Figure 12:
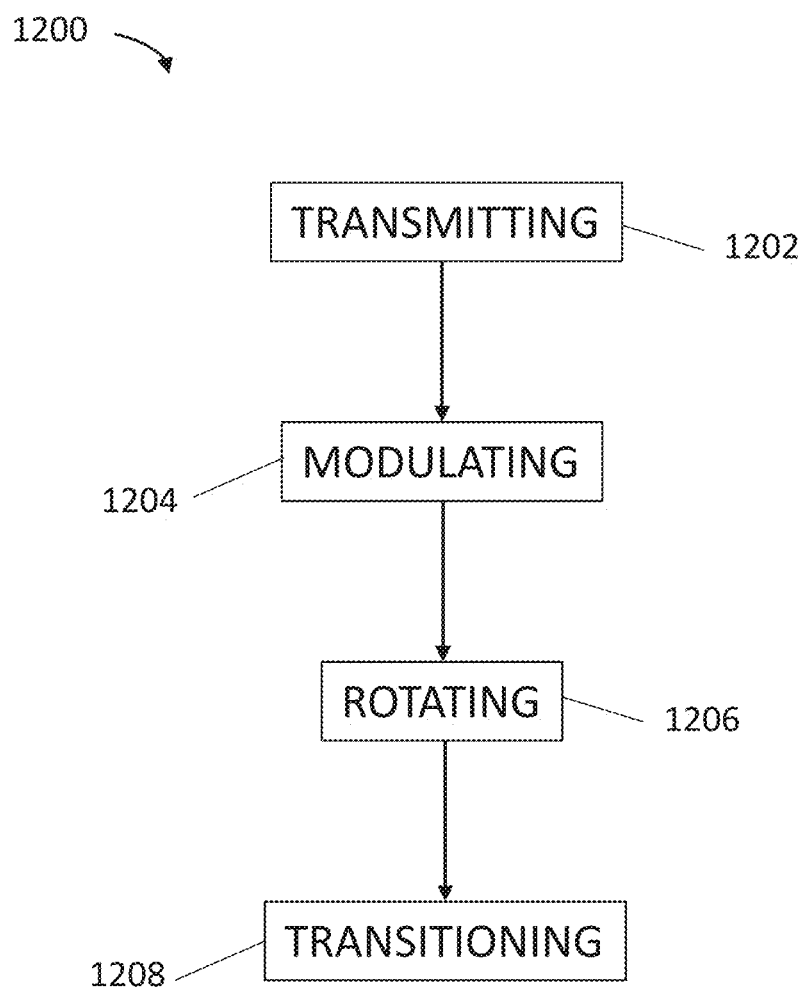
FIG. 12 depicts a flowchart of a method of operating an azimuthal multiplexing system, according to an embodiment of the present technology.

FIG. 12 depicts a flowchart of a method 1200 of operating an azimuthal multiplexing system (e.g., system 100), according to an embodiment of the present technology. In one embodiment, the method 1200 includes the step of transmitting 1202 light from a light source through two or more at least partially transparent plates having structured and patterned surfaces positioned in an optical path of the light. The method includes the step of modulating 1204, by the two or more plates, the light transmitted along the optical path and through the two or more plates. The method includes the step of rotating 1206 at least one plate of the two or more plates axially with respect to at least one other plate of the two or more plates. The method includes the step of transitioning 1208, by the rotating, through or between a plurality of output states of the light transmitted along the optical path and through at least a second plate of the two or more plates positioned most distally from the light source.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a controller (e.g., microcontroller), a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted herein, including any that may be listed in accompanying filing papers, are incorporated herein by reference. As to aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims. The appended claims thus form a part of the disclosure as if they were presented elsewhere in the instant application and, as such, any and all combination of features and elements presented in the claims are expressly incorporated by reference herein as if they were equivalently, analogously or similarly described above.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for"). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

The invention claimed is:

1. An azimuthal optical multiplexing system, comprising:
   a light source; and
   two or more at least partially transparent plates, wherein each of the two or more plates are structured or patterned, and are positioned in an optical path of the light source, and
   wherein a first plate of the two or more plates is positioned proximal to a first end of the optical path, and at least a second plate of the two or more plates is positioned proximal to a second end of the optical path opposite the first end; and
   means for rotating at least one plate of the two or more plates axially with respect to at least one other plate of the two or more plates, the means for rotating operatively coupled to the at least one plate, wherein a structure, or a pattern, of the two or more plates is configured to modulate light directed along the optical path and through the two or more plates.

2. The azimuthal optical multiplexing system of claim 1, wherein each plate of the two or more plates has a separately calculated modulation function.

3. The azimuthal optical multiplexing system of claim 2, wherein modulation functions for each of the two or more plates are respectively calculated for a given transmission pattern output of the system.

4. The azimuthal optical multiplexing system of claim 2, wherein the modulation function determines a transmittance of a respective plate of the two or more plates.

5. The azimuthal optical multiplexing system of claim 2, wherein the modulation function is a phase modulation function.

6. The azimuthal optical multiplexing system of claim 5, wherein the phase modulation function of each plate of the two or more plates is calculated using an iterative projection optimization algorithm.

7. The azimuthal optical multiplexing system of claim 1, wherein at least one of the two or more plates includes at least one hole axially bored therethrough.

8. The azimuthal optical multiplexing system of claim 1 further comprising means for detecting an output of modulated light propagated through the two or more plates, the means for detecting positioned optically downstream of the light source and downstream of at least the second plate positioned most distally from the light source.

9. The azimuthal optical multiplexing system of claim 1, wherein the structure, or the pattern, is further configured to modulate a phase of the light directed along the optical path and through the two or more plates.

10. The azimuthal optical multiplexing system of claim 1, wherein the structure, or the pattern, is further configured to modulate an amplitude of the light directed along the optical path and through the two or more plates.

11. The azimuthal optical multiplexing system of claim 1, wherein the structure, or the pattern, is further configured to encode or encrypt information.

12. The azimuthal optical multiplexing system of claim 11, wherein the information is encoded or encrypted as at least one of: images, at least one spot, a speckle pattern, a random pattern, a non-random pattern, a pseudo-random pattern, and statistics or properties of the light propagated through at least a second plate of the two or more plates positioned most distally from the light source.

13. The azimuthal optical multiplexing system of claim 1, wherein the structure, or the pattern, is further configured to provide an optical mask comprising at least one of: a random pattern, a pseudo-random pattern, a non-random pattern, a zero random pattern, and an engineered mask.

14. A method of operating an azimuthal optical multiplexing system, the method comprising:
   transmitting light from a light source through two or more at least partially transparent plates,
     wherein the two or more plates are structured, or patterned, and are positioned in an optical path of the light, and
     wherein a first plate of the two or more plates is positioned proximal to a first end of the optical path, and at least a second plate of the two or more plates is positioned proximal to a second end of the optical path opposite the first end, modulating, by the two or more plates, the light transmitted along the optical path and through the two or more plates;

rotating at least one plate of the two or more plates axially with respect to at least one other plate of the two or more plates; and transitioning, by the rotating, through or between a plurality of output states of the light transmitted along the optical path and through at least a second plate of the two or more plates positioned most distally from the light source.

15. The method of claim 14 further comprising detecting the output state of the light transmitted along the optical path and through the at least a second plate.

16. The method of claim 15, wherein a structure, or a pattern, of at least one of the two or more plates encodes or encrypts at least one piece of information, and wherein the detecting step comprises at least one of: decoding, decrypting, and visualizing, the at least one piece of information.

17. The method of claim 16, wherein the transitioning step comprises transitioning through the plurality of output states of the light to facilitate at least one of the: decoding, decrypting, and visualizing, the at least one piece of information.

18. The method of claim 14, wherein the modulating step comprises modulating at least one of: a phase, and an amplitude, of the light transmitted along the optical path and through the two or more plates.

19. The method of claim 14 further comprising encoding or encrypting at least one piece of information in a structure, or a pattern, of at least one plate of the two or more plates.

20. A cryptographic apparatus, comprising:

two or more at least partially transparent plates, wherein at least one plate of the two or more plates is structured or patterned, a first plate of the two more plates positioned proximal a first end of the apparatus, and at least a second plate of the two or more plates positioned proximal a second end of the apparatus opposite the first end;

at least one light source positioned and configured to transmit light along an optical path defined by at least portions of: the two or more plates, and the structured or patterned surface, wherein a structure, or a pattern, of the at least one plate is configured to modulate the light;

means for rotating at least one plate of the two or more plates operatively coupled to the at least one plate, the means for rotating configured to axially rotate the at least one plate with respect to at least one other plate of the two or more plates; and means for detecting the light following passage through the two or more plates along the optical path.

* * * * *